(12) United States Patent
Nagasaka

(10) Patent No.: US 8,140,189 B2
(45) Date of Patent: Mar. 20, 2012

(54) APPARATUS AND METHOD FOR COMPUTING OPERATIONAL-SPACE PHYSICAL QUANTITY

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1207 days.

(21) Appl. No.: 11/544,052

(22) Filed: Oct. 6, 2006

(65) Prior Publication Data

US 2007/0083290 A1    Apr. 12, 2007

(30) Foreign Application Priority Data

Oct. 12, 2005 (JP) ................................ 2005-298090

(51) Int. Cl.
*G05B 15/00* (2006.01)
*G05B 19/00* (2006.01)

(52) U.S. Cl. ............ 700/262; 700/245; 318/568.11; 318/568.12; 318/568.17; 318/568.19; 318/568.2

(58) Field of Classification Search ......... 700/245, 700/262; 318/567, 568.1, 568.11, 568.12, 318/568.13, 568.14, 568.15, 568.16, 568.17, 318/568.18, 568.19, 568.2, 568.21, 568.22, 318/568.23, 568.24, 568.25; 901/1; 703/1, 703/7, 18, 21; 702/150, 151, 152

See application file for complete search history.

(56) References Cited

U.S. PATENT DOCUMENTS

| | | | | | |
|---|---|---|---|---|---|
| 5,294,873 | A | * | 3/1994 | Seraji ..................... | 318/568.1 |
| 5,303,384 | A | * | 4/1994 | Rodriguez et al. ........... | 700/264 |
| 5,377,310 | A | * | 12/1994 | Jain et al. .................... | 700/260 |
| 5,546,508 | A | * | 8/1996 | Jain et al. .................... | 700/260 |
| 6,738,065 | B1 | * | 5/2004 | Even-Zohar ................. | 345/473 |
| 6,750,866 | B1 | * | 6/2004 | Anderson, III .............. | 345/474 |
| 2003/0018455 | A1 | * | 1/2003 | Rosenthal ..................... | 703/2 |
| 2003/0182518 | A1 | * | 9/2003 | Nakanishi ..................... | 711/153 |
| 2004/0210426 | A1 | * | 10/2004 | Wood ............................ | 703/2 |

(Continued)

FOREIGN PATENT DOCUMENTS

JP    2003-231077    8/2003

(Continued)

OTHER PUBLICATIONS

Featherstone et al., Robot Dynamics—Equations and Algorithms, Apr. 2000, Proceedings of the 2000 IEEE international Conference on Robotics and Automation, San Francisco, CA, 0-7803-5886-4/00, pp. 826-834.*

(Continued)

*Primary Examiner* — Khoi Tran
*Assistant Examiner* — Jamie Figueroa
(74) *Attorney, Agent, or Firm* — Finnegan, Henderson, Farabow, Garrett & Dunner, L.L.P.

(57) ABSTRACT

An operational space physical quantity calculation apparatus computes a physical quantity in an operational space describing a relationship between a force and acceleration acting on a link structure including a plurality of linked rigid bodies. The operational space physical quantity calculation apparatus includes a forward dynamics calculating unit configured to perform a forward dynamics calculation on the basis of force information about a force acting on the link structure in order to obtain accelerations occurring at certain points of the link structure and an operational space physical quantity computing unit configured to compute an inverse operational space inertia matrix and an operational space bias acceleration by causing the forward dynamics calculating unit to perform the forward dynamics calculation using a kinetic model of the link structure.

48 Claims, 20 Drawing Sheets

U.S. PATENT DOCUMENTS

| | | | | |
|---|---|---|---|---|
| 2005/0075755 A1* | 4/2005 | Takenaka et al. | | 700/245 |
| 2005/0209534 A1* | 9/2005 | Dariush | | 600/595 |
| 2005/0209535 A1* | 9/2005 | Dariush | | 600/595 |
| 2005/0209536 A1* | 9/2005 | Dariush | | 600/595 |

FOREIGN PATENT DOCUMENTS

| | | |
|---|---|---|
| JP | 2004-167676 | 6/2004 |
| JP | 2004-181613 | 7/2004 |
| JP | 2007-030054 | 2/2007 |

OTHER PUBLICATIONS

Jablokow et al, Alternate Forms of the Operational Space Inertia Matrix for the Dynamic Simulation of Complex Robot Systems, 2003, IEEE, 0-7803-7959-7/03, pp. 2225-2230.*

Naudet et al., Forward Dynamics of Open-Loop Multibody Mechanisms Using an Efficient Recursive Algorithm Based on Canonical Momenta, 2003, IEEE, Multibody System Dynamics, pp. 45-59.*

Aghili, F., Inverse and direct dynamics of constrained multibody systems based on orthogonal decomposition of generalized force, Sep. 2003, IEEE, 0-7803-7736-2/03, pp. 4035-4041.*

Lilly, K., Efficient O(N) recursive computation of operational space inertia matrix, Sep./Oct. 2003, IEEE Transactions on Systems, Man. and Cybernetics, vol. 23, No. 5, pp. 1384-1391.*

Anderson et al., Improved 'Order-N' Performance Algorithm for the Simulation of Constrained Multi-Rigid-Body Dynamic Systems, 2003, IEEE, Multibody System Dynamics, pp. 185-212.*

Notification of Reasons for Refusal dated Jun. 7, 2010, from the Japanese Patent Office in corresponding Japanese patent Application No. 2005-298090, and English language translation thereof (13 pages).

Yamane et al., "Choreography of Humanoids Considering Physical Consistency Based on Operational Space Inverse Inertia," Japanese Society of Mechanical Engineers, Jun. 7, 2002, 2P1-K12(1)-(2) (2 pages).

Chang et al., "Efficient Algorithm for Extended Operational Space Inertia Matrix," Proceedings of the IEEE International Conference on Intelligent Robots and Systems, pp. 350-355, (1999) (6 pages).

Jablokow, et al., "Alternate Forms of the Operational Space Inertia Matrix for the Dynamic Simulation of Complex Robot Systems," Proceedings of IEEE International Conference of System, Man, and Cybernetics, pp. 2225-2230, (2003) (6 pages).

* cited by examiner

NORMAL FORCE INFORMATION COMPUTING ROUTE

NORMAL ACCELERATION INFORMATION COMPUTING ROUTE

OPTIMIZED FORCE INFORMATION COMPUTING ROUTE

OPTIMIZED ACCELERATION INFORMATION COMPUTING ROUTE

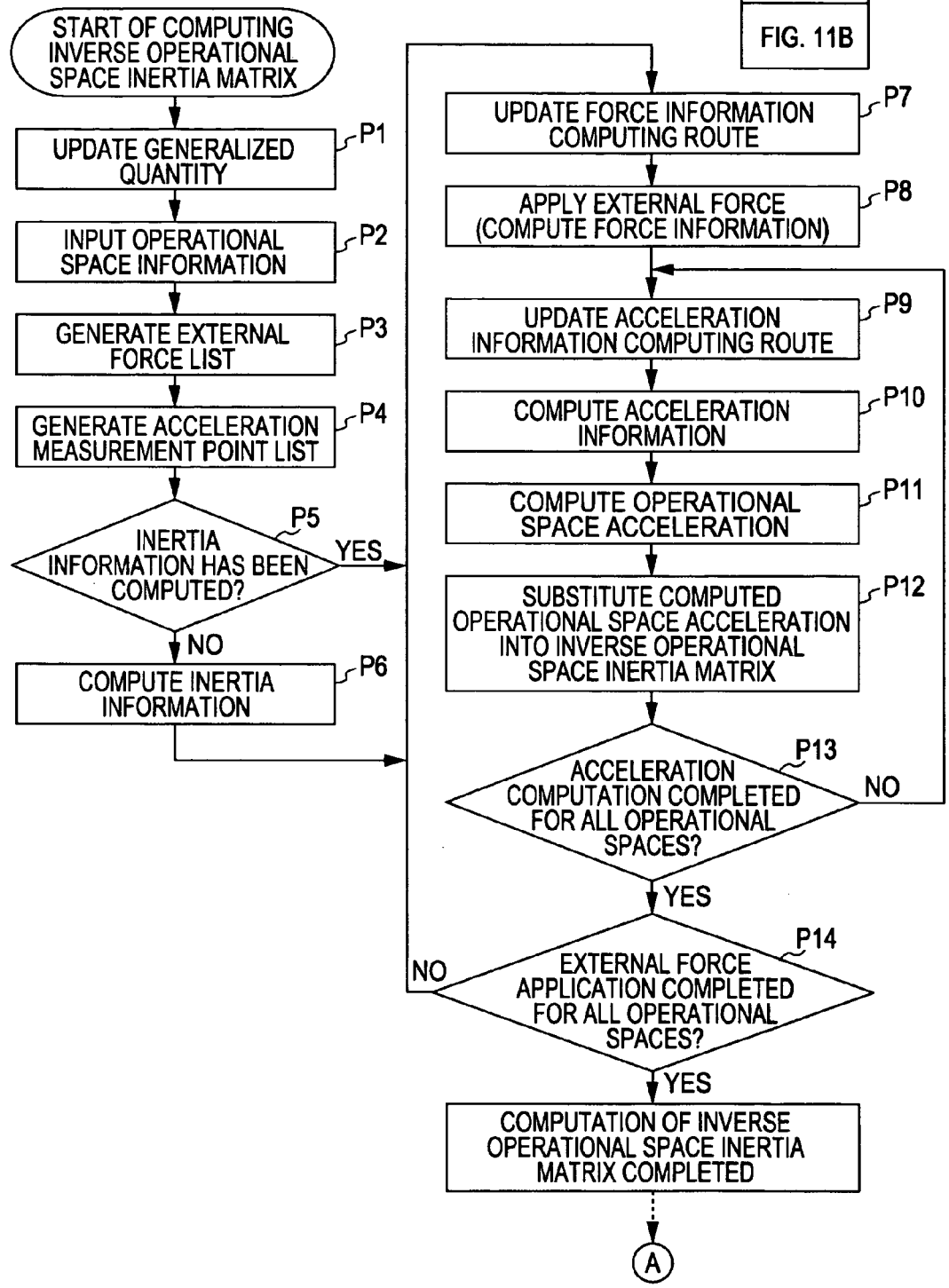

| FIG. 12A |
| FIG. 12B |

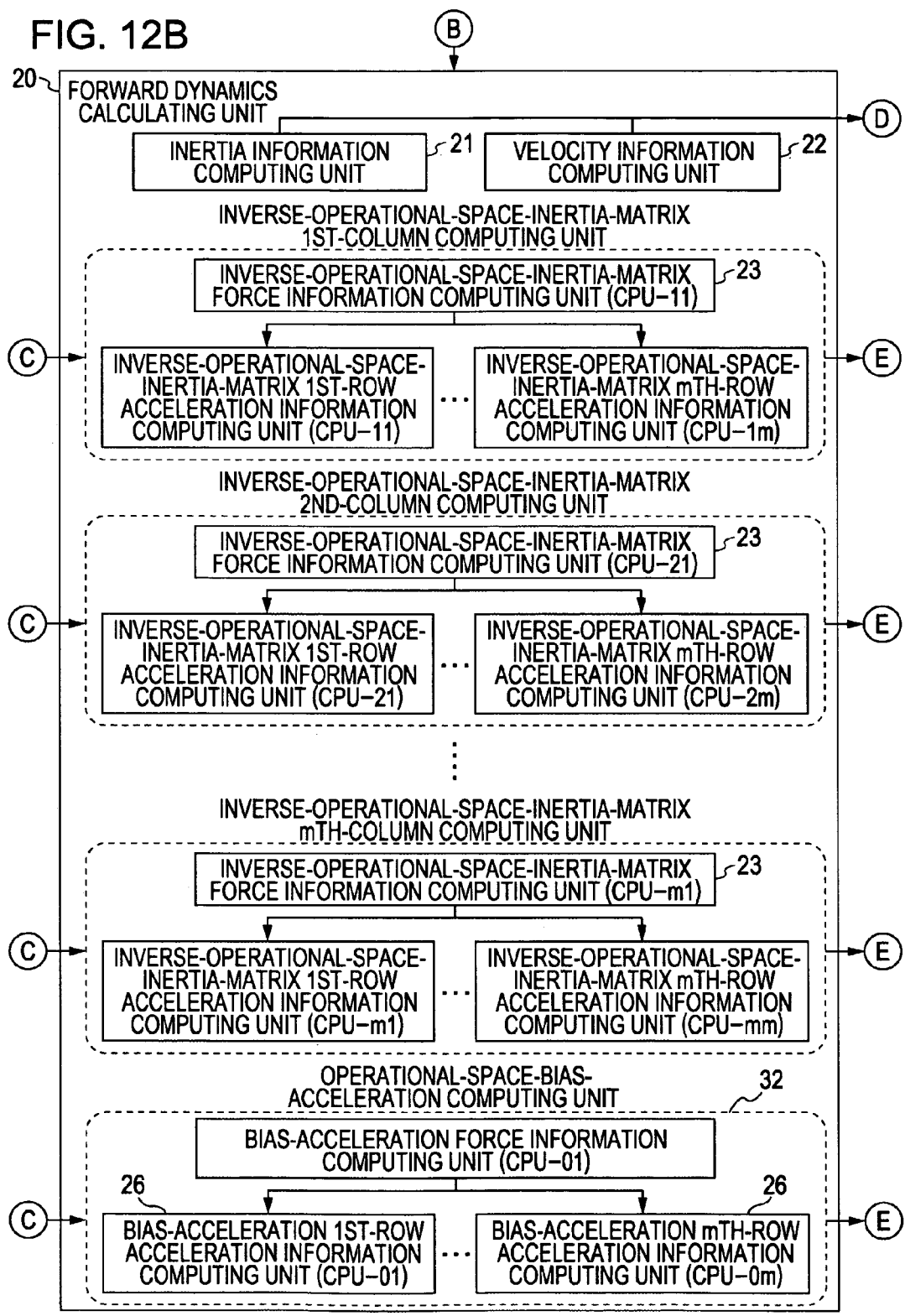

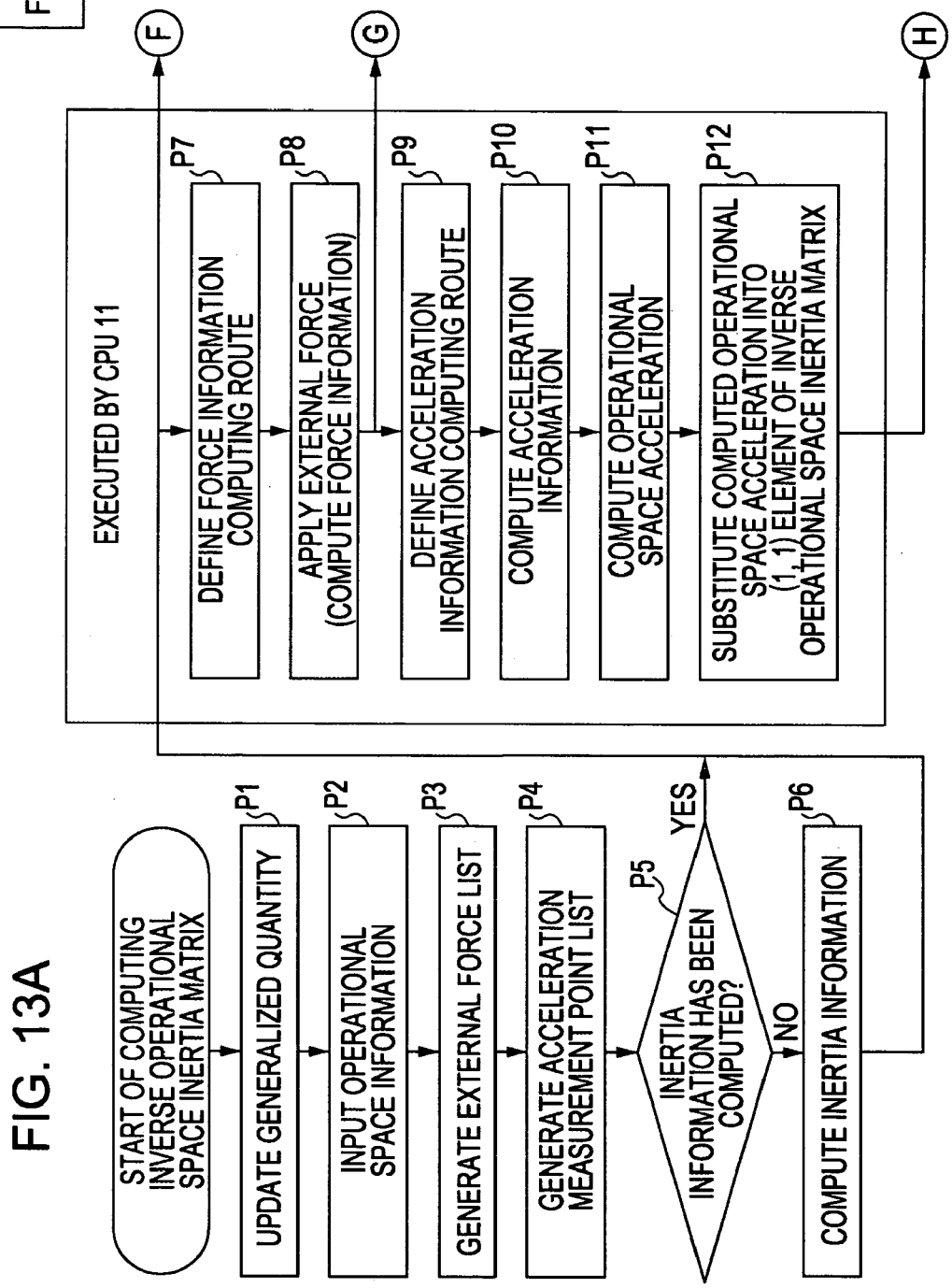

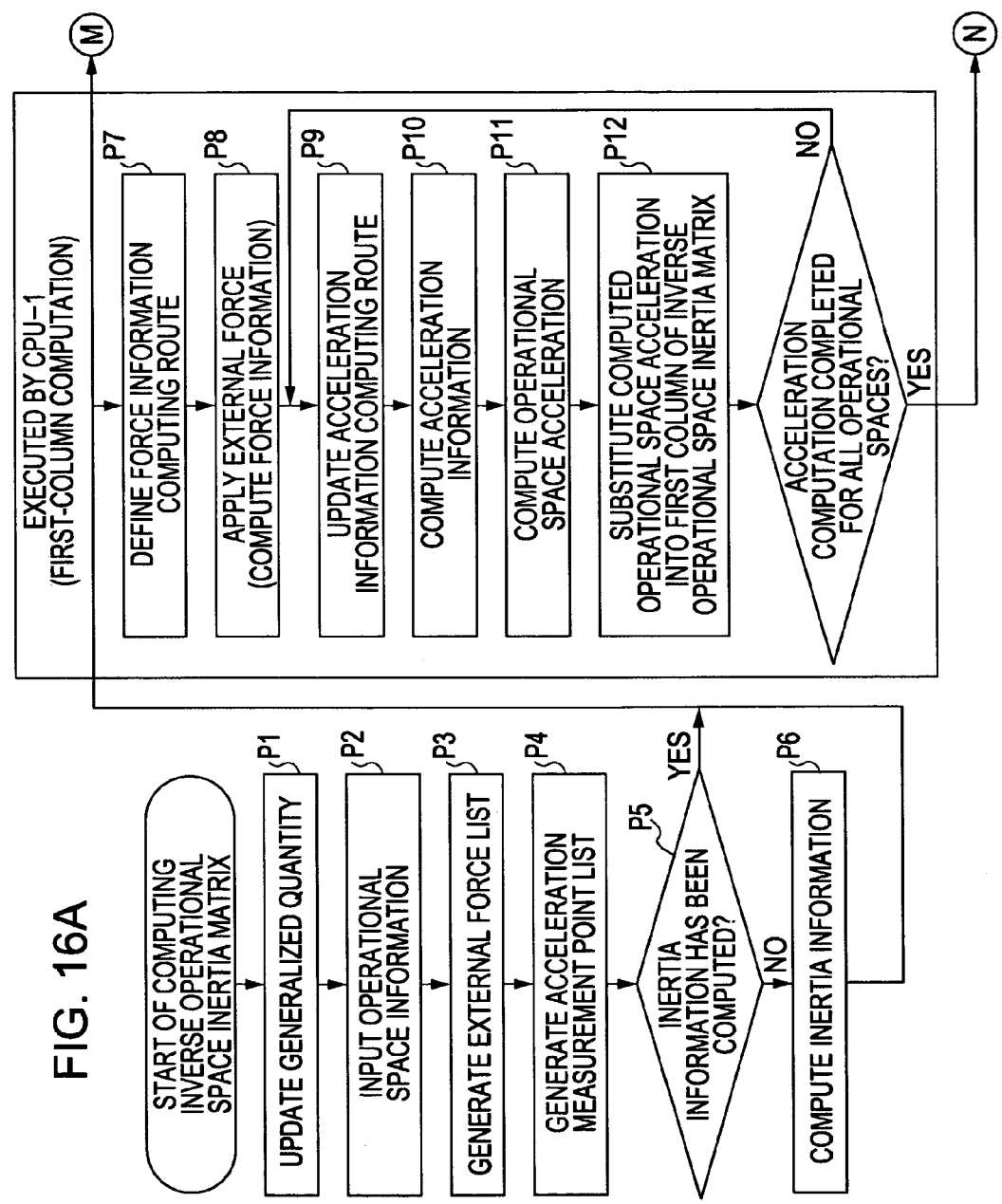

APPARATUS AND METHOD FOR COMPUTING OPERATIONAL-SPACE PHYSICAL QUANTITY

CROSS REFERENCES TO RELATED APPLICATIONS

The present invention contains subject matter related to Japanese Patent Application JP 2005-298090 filed in the Japanese Patent Office on Oct. 12, 2005, the entire contents of which are incorporated herein by reference.

BACKGROUND OF THE INVENTION

1. Field of the Invention

The present invention relates to an apparatus and a method for computing an operational-space physical quantity that is required for controlling the operation of a robot (such as a legged robot) that has a complicated link mechanism and that carries out a task while interacting with the external world and, in particular, to an apparatus and a method for computing an operational-space physical quantity that is required for precisely and flexibly controlling the velocity and the acceleration in accordance with an external force by applying a force control to the operation of a link structure composed of a plurality of linked rigid bodies.

More particularly, the present invention relates to an apparatus and a method for computing an operational-space physical quantity in an operational space that defines a relationship between a force exerted on a link structure driven by a force control system and acceleration, and still more particularly, to an apparatus and a method for computing an operational-space physical quantity that are applicable even when an operational space relates to the positions and orientations of a plurality of points of a structure.

2. Description of the Related Art

Recently, the research and development relating to the structure and the stable walking control of legged mobile robots has been successful, and therefore, a practical application of the legged moving robot is expected to become increasingly widespread. These legged mobile robots are unstable compared with crawler robots, and therefore, it is difficult to control the posture and the waking of the legged mobile robots. However, the legged mobile robots have an advantage in that flexible walking and moving operations (such as operations of moving stairways and riding over an obstacle) can be achieved. For example, a humanoid robot has been proposed that has legs as a moving mechanism and that can generate a stable moving pattern of the transition between an on-the-ground state and an off-the-ground state in real time (refer to, for example, Japanese Unexamined Patent Application Publication No. 2004-167676).

Most of known legged robots include joints driven using a position control, since the position control facilitates the ease of control and the design of system configuration. The position control is basically aimed at keeping the position. Accordingly, the position control is known as a "hard control". The position control is not suitable for flexibly responding an external force and precisely controlling the velocity and acceleration.

In particular, since a partner-type legged robot carries out a task while physically interacting with a variety of external worlds, the position control is not suitable for the partner-type legged robot by nature. Ideally, it is desirable that the partner-type legged robot is driven by a force control system, although the control rule and the system configuration are complicated.

Here, in the robot control using the force control system, the concept of "operational space" is important. The operational space refers to a space used to describe a relationship between a force acting on a robot and the acceleration generated for the robot. For example, when the joint angle of a robot is subjected to a torque control, not a position control, and the interface between the robot and the environment is defined by a constraint condition, this operational space is essential. Here, examples of the constraint conditions include a constraint condition for self-interference of the robot, a constraint condition involved in an available joint angle, an event indicating that a hand fits an object, and an event indicating that the right and left eyes are horizontally aligned.

In a structure composed of a rigid bodies linked using joints, a vector generated by unifying the values of the joints is called as a generalized variable. This generalized variable is represented using a symbol "q". By associating the temporal differentiation of the generalized variable q with a physical quantity x using the Jacobian matrix J, the operational space can be defined for the physical quantity x as follows:

$$\dot{x} = J\dot{q} \quad (1)$$

Intuitively, examples of the operational space include the Cartesian coordinate system for carrying out a task, such as the position and orientation of a hand provided on the top end of a manipulator or other end-effectors (refer to, for example, "A unified approach to motion and force control of robot manipulators: The operational space formulation," IEEE Journal of Robotics and Automation, RA-3(1), pp. 43-53, 1987 (hereinafter referred to as "Non-patent document 1")).

The operational space, namely, the relationship between the acceleration of a physical quantity x and a force will be described in more detail below. Basically, the operational space is defined as a matrix known as an "inverse operational space inertia matrix". That is, the inverse operational space inertia matrix is a representation for associating a force with an acceleration and is expressed as a matrix $\Lambda^{-1}$ of the following equation:

$$\Lambda^{-1} = JH^{-1}J^T \quad (2)$$

where H denotes an inertia matrix for the joint space of the entire structure.

The inverse operational space inertia matrix is an important physical quantity that can be applied to many technical fields including force control, force simulation, computer animation, posture editing, and external force estimation. For example, a method has been proposed for generating motions of joints of a human-like link structure by computing a joint acceleration while taking into account a constraint condition involved in forward dynamics or by simultaneously solving an equation of a forward dynamics constraint condition formulated using a force exerted on a link and an inverse operational space inertia matrix representing a relationship between the force and the acceleration caused by the force and an equation of a kinetic constraint condition (refer to, for example, Japanese Unexamined Patent Application Publication No. 2003-231077).

However, in order to compute the inverse operational space inertia matrix using equation (2), a large amount of computation is required. Accordingly, the computation of equation (2) is not suitable for real-time processing.

For example, let N denote the number of degrees of freedom (the number of joints) of the structure in equation (2), then the inertia matrix H has a size of N×N. When the dimension of the operational space x is M, the size of $\Lambda^{-1}$ is M×M. If N>M and the computation is performed using equation (2), waste of computational time occurs, as can be easily seen. In particular, when, as for a humanoid robot, the number of joints is more than or equal to 30 (i.e., N≧30), the difference between N and M is noticeable. Accordingly, it is difficult to compute the inverse operational space inertia matrix in real time. In most cases, the number M of operational degrees of freedom is smaller than the number N of degrees of freedom of a robot. Therefore, it is desirable that the inverse operational space inertia matrix $\Lambda^{-1}$ can be directly computed without using the inertia matrix H.

To solve the above-described problem, a direct solution of an inverse operational space inertia matrix has been proposed. For example, a method has been proposed in which the block diagonal components and the block non-diagonal components of the inverse operational space inertia matrix $\Lambda^{-1}$ are directly computed by means of dynamics calculation using physical quantities known as an acceleration propagator and a force propagator (refer to, for example, "Operational Space Dynamics: Efficient Algorithms for Modeling and Control of Branching Mechanisms," Proc. of the 2000 IEEE Int. Conf. on Robotics and Automation, pp. 850-856, 2000 (hereinafter referred to as "Non-Patent document 2")). However, this method can be only applied to the case where one operational space corresponds to the position and orientation of one point of the link structure. For example, for a multi-axis robot shown in FIG. 17, if a force corresponding to an operational space is applied to only a point A shown in the left section of FIG. 17, this method can be applied. However, as shown in the right section of FIG. 17, if forces corresponding to an operational space are applied to more than or equal to two points (such as the relative position and orientation between points B and C), this method cannot be applied.

In the case shown in the right section of FIG. 17, the operational space inertia inverse matrices for the points B and C are computed first. Then, by computing the difference between the two matrices, the inverse operational space inertia matrix for the operational space can be eventually computed. However, waste of computational time occurs. Additionally, when collision between the points B and C of application of force, that is, the interference between the links of a mobile robot (self-interference) is taken into account, the inertia matrix H is essential.

Furthermore, in the force control of a legged mobile robot, the center of gravity and the kinetic momentum of the entire structure should be controlled on the basis of the concept of operational space. In particular, for a biped mobile humanoid robot, in order to perform a balance control, the center of gravity and the kinetic momentum of the whole body are essential factors. When the operational space is defined by the center of gravity and the kinetic momentum, a force corresponding to one operational space is applied on the centers of gravity of all of links, as shown in FIG. 18, which is described in more detail below. In this case, for the reason relating to the above-described self-interference, the method for directly computing the inverse operational space inertia matrix (see Non-Patent document 2) cannot be applied. In addition, even when the computation for forces applied to all of the links is attempted, a considerable amount of computation is required not only for the inverse operational space inertia matrix $\Lambda^{-1}$ but also for the Jacobian matrix J. Thus, an enormous computational load is generated.

SUMMARY OF THE INVENTION

Accordingly, the present invention provides an excellent apparatus and a method for computing an operational-space physical quantity required for accurately controlling the velocity and the acceleration of a robot (such as a legged robot) that has a complicated structure and that carries out a task while interacting with the external world by using a force control.

The present invention further provides an excellent apparatus and a method for computing an inverse operational space inertia matrix and the associated bias acceleration that are important physical quantities required for operating a complicated link structure (such as a robot) for carrying out a task under the force control at high speed.

The present invention further provides an excellent apparatus and a method for appropriately achieving a force control of a legged mobile robot by directly and efficiently computing an inverse operational space inertia matrix even when an operational space relates to the positions and orientations of a plurality of points of a structure.

The present invention further provides an excellent apparatus and a method capable of controlling the kinetic momentum of the entire structure under the force control by defining an operational space (a kinetic momentum operational space) for a physical quantity having no operational points (such as the center of gravity and angular momentum) and computing the inverse operational space inertia matrix of the operational space.

An embodiment of the present invention addresses the problems described above by providing an operational space physical quantity calculation apparatus for computing a physical quantity in an operational space describing a relationship between a force and acceleration acting on a link structure including a plurality of linked rigid bodies. The operational space physical quantity calculation apparatus includes forward dynamics calculating means for performing a forward dynamics calculation on the basis of force information about a force acting on the link structure in order to obtain an acceleration occurring at certain points of the link structure and operational space physical quantity computing means for computing an inverse operational space inertia matrix and an operational space bias acceleration by causing the forward dynamics calculating means to perform the forward dynamics calculation using a kinetic model of the link structure.

In general, in order to control the operation of a link structure (such as a legged robot), the position control is employed since the position control facilitates the control and the design of the system. However, the position control is not suitable for flexibly responding to an external force and precisely controlling the velocity and acceleration of the link structure. That is, ideally, it is desirable that the link structure is controlled using a force control system although the control rule and the system configuration are complicated.

For the force control system, the concept "operational space" is important in order to describe a relationship between a force acting on a robot and the acceleration generated for the robot. When the joint angle of the robot is subjected to a force control, not a position control, and the interface between the robot and the environment is defined by a constraint condition, this operational space is essential. The operational space, namely, the relationship between the acceleration and the force can be expressed by using the inverse operational space inertia matrix.

However, in an ordinary computation of the inverse operational space inertia matrix, an inertia matrix H for the joint space of the entire structure appears, and therefore, waste of computational time occurs. Accordingly, an enormous computational amount is required for the computation of the inverse operational space inertia matrix, and therefore, force control is not suitable for real-time processing. To address this problem, a method has been proposed in which the block diagonal components and the block non-diagonal components of the inverse operational space inertia matrix $\Lambda^{-1}$ are directly computed by means of dynamics calculation using physical quantities known as an acceleration propagator and a force propagator. However, this method can be only applied to the case where one operational space corresponds to the position and orientation of one point of the link structure. If forces corresponding to an operational space are applied to more than or equal to two points, this method cannot be applied.

According to an embodiment of the present invention, by applying a forward dynamics calculation for acquiring a generalized acceleration (joint acceleration) from the generalized force (a joint force) of the link structure, the inverse operational space inertia matrix can be computed at high speed. In addition, the computational load can be reduced.

The operational space physical quantity computing means can obtain the acceleration occurring at each individual point of the link structure by performing the forward dynamics calculation under the following constraint conditions: a force occurring at a joint of the link structure is zero, the velocity of the joint is zero, the gravity force is zero, and only an external force acts on the link structure. That is, by performing the forward dynamics calculation under the constraint condition that applies a unit external force only to the ith operational space and sequentially computing the ith column of the inverse operational space inertia matrix, the entire inverse operational space inertia matrix can be computed.

The operational space physical quantity computing means can obtain the acceleration occurring at certain points of the link structure as an operational space bias acceleration by performing the forward dynamics calculation under the following constraint conditions: an external force is zero and only a force occurring at a joint, the velocity of the joint, and the gravity force act.

The forward dynamics calculating means can divide the forward dynamics calculation into an inertia information computation, a velocity information computation, a force information computation, and an acceleration information computation and can execute the above-described four calculations in this order. In such a case, an acceleration occurring at any point in any direction can be obtained under the condition in which any force acts on the link structure, such as a legged mobile robot. That is, since the forward dynamics can cause a plurality of forces to act at the same time or can compute accelerations occurring at a plurality of points, the forward dynamics is easily applicable to the computation of the inverse operational space inertia matrix when one operational space relates to the positions and the orientations of a plurality of points of the structure.

Additionally, the forward dynamics calculating means can define the forward dynamics calculation so that a plurality of external forces can act at the same time or accelerations of a plurality of points can be computed.

Additionally, when dividing the forward dynamics calculation into four steps, the forward dynamics calculating means can optimize each of the four steps.

For example, since the inertia information is not changed unless the orientation of the link structure (i.e., the joint value) is changed, the forward dynamics calculating means only needs to compute the inertia information once when a joint value q serving as a generalized variable changes.

Additionally, when the forward dynamics calculating means computes the inverse operational space inertia matrix, all of joint velocities are set to zero. Therefore, obviously, $v_i=0$. Accordingly, the forward dynamics calculating means can compute the velocity information only when computing the operational space bias acceleration and can eliminate the computation of the velocity information when computing the inverse operational space inertia matrix.

In addition, when the forward dynamics calculating means computes the inverse operational space inertia matrix, a joint velocity and a force occurring at a joint are zero. Accordingly, by eliminating the computation for the terms including these factors, the forward dynamics calculating means can optimize the computation of force information.

Furthermore, since, obviously, bias forces $p^A_i=0$ for a link that is not on the route between the point of application of force and the base, the forward dynamics calculating means can optimize the computation of force information by computing a bias force $p^A_i$ only for a link that is on the route between the point of application of force and the base.

Still furthermore, the forward dynamics calculating means can optimize the computation of the acceleration information by taking into account the fact that the joint velocity and the force occurring at a joint are zero when computing the inverse operational space inertia matrix and the result of the above-described optimization of the force information. In such a case, when computing an acceleration at a given point, the forward dynamics calculating means can further optimize the computation of the acceleration information by updating the accelerations along a route on a curve from the point closest to the given point among points for which the computation of the accelerations have been completed to the given point. In addition, when computing the operational space bias acceleration, the forward dynamics calculating means can optimize the computation of the acceleration information by computing accelerations on only a route beginning from the base to the link for which the acceleration is to be computed.

As noted above, by optimizing each of the four steps of the forward dynamics calculation, the forward dynamics calculation can be applied to the case where one operational space relates to the positions and orientations of a plurality of points of the structure and can also compute the inverse operational space inertia matrix at high speed.

Additionally, since the inverse operational space inertia matrix is a symmetric matrix, the forward dynamics calculating means can compute only the upper triangular matrix or the lower triangular matrix of the inverse operational space inertia matrix.

Additionally, the forward dynamics calculating means can include a recursive calculation among the rigid bodies. In such a case, the forward dynamics calculating means can further include computing route determining means for extracting the rigid bodies to be recursively calculated, and the forward dynamics calculating means can perform the recursive calculation only for the rigid bodies determined by the computing route determining means.

The above-described methods for computing the inverse operational space inertia matrix and the operational-space bias acceleration can be further sped up by executing the methods on a parallel computer known as a grid computer or a cluster PC. This is because, although the inverse operational space inertia matrix is an M×M square matrix, each of the elements of the matrix can be independently computed by using different CPUs. In addition, the operational-space bias acceleration is a vector having M elements. Each element of the operational-space bias acceleration vector can also be independently computed by using different CPUs.

For example, the forward dynamics calculating means can include a processor for computing the force information used for the inverse operational space inertia matrix for each of the columns of the inverse operational space inertia matrix and can carry out the computation for each of the columns of the inverse operational space inertia matrix in parallel. In such a case, the forward dynamics calculating means can further include a processor for each row of the inverse operational space inertia matrix in order to compute the acceleration information of the inverse operational space inertia matrix using the force information output from the processor for each column. Thus, the forward dynamics calculating means can compute the elements in the same column in the row direction in parallel.

Additionally, the forward dynamics calculating means can independently include a processor for computing the force information used for the operational space bias acceleration for each of rows of an operational space bias acceleration vector and can carry out the computation for each of the rows of the bias-acceleration acceleration information in parallel.

As stated above, by configuring the operational space physical quantity calculation apparatus so as to compute the inverse operational space inertia matrix and the bias acceleration, the computations for the elements of the matrix or the vector can be computed in parallel. Accordingly, the computation of all the elements can be completed within the computing time required for the computation of one element, and therefore, significant speed-up in the total time can be achieved. Obviously, a configuration in which only some of the elements are computed in parallel can also achieve the significant speed-up.

Alternatively, the forward dynamics calculating means can include the processor for each column for computing acceleration information used for the inverse operational space inertia matrix using the force information output from the processor provided for each column, and the forward dynamics calculating means can compute the acceleration for one column by repeatedly using the processor provided for the column. In such a case, since the columns of the inverse operational space inertia matrix can be computed in parallel, the computation of all the elements can be completed within the computing time in proportion to the number of the columns of the inverse operational space inertia matrix, and therefore, the speed-up can be effectively achieved.

As noted above, according to an embodiment of the present invention, the flexible and high-speed computation of the inverse operational space inertia matrix can be provided. When the fullbody motion of a legged mobile robot is performed under the force control, tasks need to be performed while taking into account many constraint conditions. By applying the embodiment of the present invention, even the processing speed of currently available computers can achieve the fullbody motion of the legged mobile robot.

For example, when the operational space physical quantity calculation apparatus is used for controlling the link structure under the force control, the operational space physical quantity calculation apparatus can further include joint force determining means for determining a joint force of the link structure using the calculated inverse operational space inertia matrix and the calculated operational space bias acceleration. The joint force determining means can compute, by using the inverse operational space inertia matrix and the operational space bias acceleration computed by the operational space physical quantity computing means, an acceleration and a force that satisfy a linear complementarity problem including an equation describing a relationship between an acceleration and a force in an operational space described using an inverse operational space inertia matrix and an operational space bias acceleration and constraint conditions between the links of the link structure and between the link and the environment, and the joint force determining means can determine the joint force of the link on the basis of the computed force.

According to another embodiment of the present invention, a kinetic simulation apparatus reconstructs a physical interaction including a collision and a contact between virtual objects in a virtual environment in which a plurality of the virtual objects coexist. The kinetic simulation apparatus includes forward dynamics calculating means for performing a forward dynamics calculation on the basis of a kinetic model of the virtual objects on which physical interactions act and an external force caused by the physical interactions in order to obtain an acceleration occurring at each of the virtual objects, operational space physical quantity computing means for computing an inverse operational space inertia matrix and an operational space bias acceleration by causing the forward dynamics calculating means to perform the forward dynamics calculation using the kinetic model of the virtual objects, and external force determining means for computing, by using the inverse operational space inertia matrix and the operational space bias acceleration computed by the operational space physical quantity computing means, an acceleration and a force that satisfy a linear complementarity problem including a relational expression of an acceleration and a force in an operational space described using an inverse operational space inertia matrix and an operational space bias acceleration and constraint conditions imposed when the physical interactions act and determining an external force acting on the virtual object on the basis of the obtained force.

According to the embodiment of the present invention, the method for calculating the inverse operational space inertia matrix is applicable to many technical fields including a kinetic simulation, a computer animation, posture editing, and external force estimation in addition to the force control of a robot. For example, this method is also effective when a plurality of objects coexist in a virtual environment and a real-time kinetic simulation is carried out in order to reconstruct physical interactions (e.g., collisions and contacts) among the objects or when a plurality of objects coexist in a virtual environment and the objects are operated. Real-time and accurate kinetic calculation in a kinetic simulation can be performed even in a complicated environment by applying a force between objects to the forward dynamics calculation (see Non-patent document 2) as an external force.

For example, the operational space physical quantity computing means can define an operational space in directions of a vertical reaction force and a frictional force acting on the virtual objects due to the physical interactions, and the external force determining means can define a linear complementarity problem using constraint conditions for realizing a reaction having a reaction coefficient specified between the virtual objects and an appropriate frictional force. Subsequently, by solving the linear complementarity problem, the external force determining means can determine the external force acting on the virtual object when the physical interactions occur.

Additionally, the operational space physical quantity computing means can define an operational space in a direction of an error of a relative position between the virtual objects, and the external force determining means can define a linear complementarity problem using a constraint condition that places the virtual objects at specified relative positions. Subsequently, by solving the linear complementarity problem, the external force determining means can determine the external force acting on the virtual object when the physical interactions occur.

Additionally, when the virtual object on which the physical interaction act is a link structure in which a plurality of rigid bodies are linked (such as a human figure), the external force determining means can define a linear complementarity problem using a constraint condition relating to one of the position and the orientation of each of the links of the link structure.

Additionally, the kinetic simulation apparatus can further include force presenting means for generating the external force determined by the external force determining means using an actuator and presenting the external force. The force presenting means allows the sensation of touching the object in the virtual environment to be precisely reproduced in real time. Alternatively, by feeding back a force acting on an object when a predetermined position of the object in the virtual environment is pulled or twisted, the force presenting means can precisely provide the sensation of the reaction force to the pull or the twist.

Accordingly, a user can control the motion of a human figure and edit the posture of the human figure while receiving the sensation of a force that is the same as that received when the user touches a real object and edits the posture of the human figure. Furthermore, using such force-based posture editing, unstable behavior in the vicinity of a singular point, which often appears in reverse kinematics, can be eliminated.

According to still another embodiment of the present invention, a computer-readable program causes a computer system to compute a physical quantity in an operational space describing a relationship between a force acting on a link structure in which a plurality of rigid bodies are linked and an acceleration. The computer-readable program includes the steps of (a) computing an inverse operational space inertia matrix by causing the computer system to perform a forward dynamics calculation on the basis of a kinetic model of the link structure and information about a force acting on the link structure in order to obtain an acceleration occurring at certain points of the link structure and (b) computing an operational space bias acceleration by causing the computer system to perform the forward dynamics calculation.

According to yet still another embodiment of the present invention, a computer-readable program causes a computer system to execute a kinetic simulation method for reconstructing a physical interaction including a collision and a contact between virtual objects in a virtual environment in the computer system. The computer-readable program includes the steps of (a) computing an inverse operational space inertia matrix and an operational space bias acceleration by causing the computer system to perform a forward dynamics calculation on the basis of a kinetic model of virtual objects on which physical interactions act and an external force caused by the physical interactions in order to obtain an acceleration occurring at each of the virtual objects and (b) computing, by using the inverse operational space inertia matrix and the operational space bias acceleration computed in step (a), an acceleration and a force that satisfy a linear complementarity problem including a relational expression of an acceleration and a force in an operational space described using an inverse operational space inertia matrix and an operational space bias acceleration and constraint conditions imposed when the physical interactions act and determining an external force acting on the virtual object on the basis of the obtained force.

According to the above-described embodiments, the computer-readable programs define computer-readable programs that achieve predetermined operations on a computer system. That is, by installing the computer-readable programs in a computer system, the cooperative operations are performed on the computer system so that the functions of the above-described operational space physical quantity calculation apparatus and kinetic simulation apparatus can be provided.

As described above, the embodiments of the present invention can provide an excellent apparatus and a method for computing an operational-space physical quantity. The apparatus and method can appropriately compute an inverse operational space inertia matrix and the associated bias acceleration that are important physical quantities required for accurately controlling the velocity and the acceleration of a complicated link structure (such as a robot) by employing force control for the operation of the robot carrying out a task while flexibly interacting with the external forces.

Additionally, the embodiments of the present invention can provide an excellent apparatus and a method for computing an operational-space physical quantity that can compute an inverse operational space inertia matrix and the associated bias acceleration that are important physical quantities required for operating a robot at high speed under force control with low computational load by employing a forward dynamics calculation.

Additionally, the embodiments of the present invention can provide an excellent apparatus and a method for computing an operational-space physical quantity that can define an operational space (a momentum operational space) for a physical quantity having no operational point (such as a center of gravity and an angular momentum) and obtain the inverse operational space inertia matrix of the operational space.

According to the embodiments of the present invention, by adopting a parallel computation using a plurality of CPUs, the inverse operational space inertia matrix can be computed at high speed.

According to the embodiments of the present invention, by adopting an algorithm based on a forward dynamics calculation, an inverse operational space inertia matrix (and an operational space bias vector) can be computed with excellent computational efficiency even when one operational space relates to the positions and orientations of a plurality of points of a structure.

The embodiments of the present invention can be widely applied to the force control of a link structure. For example, even when a variety of constraints are imposed on the motion of a complicated structure, the inverse operational space inertia matrix (and an operational space bias vector) can be computed at high speed. Accordingly, the force control can be carried out in real time. In addition, even when one operational space corresponds to a plurality of points of a structure (such as in self-interference, an operation of the center of gravity, and angular momentum), the force control can be efficiently performed. Thus, further complicated control can be achieved.

By applying the embodiments of the present invention to a collision force calculation in a rigid kinetic simulation, a high-speed simulation can be achieved. For example, in the example shown in the right section of FIG. 17, a collision between two rigid bodies can be simulated by introducing an operational space to the relative position of the two rigid bodies. According to the embodiments of the present invention, even when one operational space corresponds to a plurality of points of a structure, the inverse operational space inertia matrix (and the operational space bias vector) can be computed at high speed.

Additionally, by using the real-time calculation of an inverse operational space inertia matrix according to the embodiments of the present invention, precise presentation of force feedback using a haptic device can be provided, and high-fidelity pose editing of a human figure using the presentation of force feedback can be performed.

Further features and advantages of the present invention will become apparent from the following detailed description of exemplary embodiments with reference to the attached drawings.

DESCRIPTION OF THE PREFERRED EMBODIMENTS

Exemplary embodiments of the present invention are described in detail below with reference to the accompanying drawings.

These embodiments of the present invention relate to an operation control apparatus for carrying out precise control of the velocity and acceleration while flexibly responding to an external force in the operation performed by a legged mobile robot having a complicated structure to carry out a task while interacting with the external world. In these embodiments, by applying high-speed forward dynamics calculation, the inverse operational space inertia matrix that is a physical quantity important for operating a robot under the force control is computed at high speed, and therefore, real-time force control can be achieved.

Structure of Robot Apparatus

Figure 1:
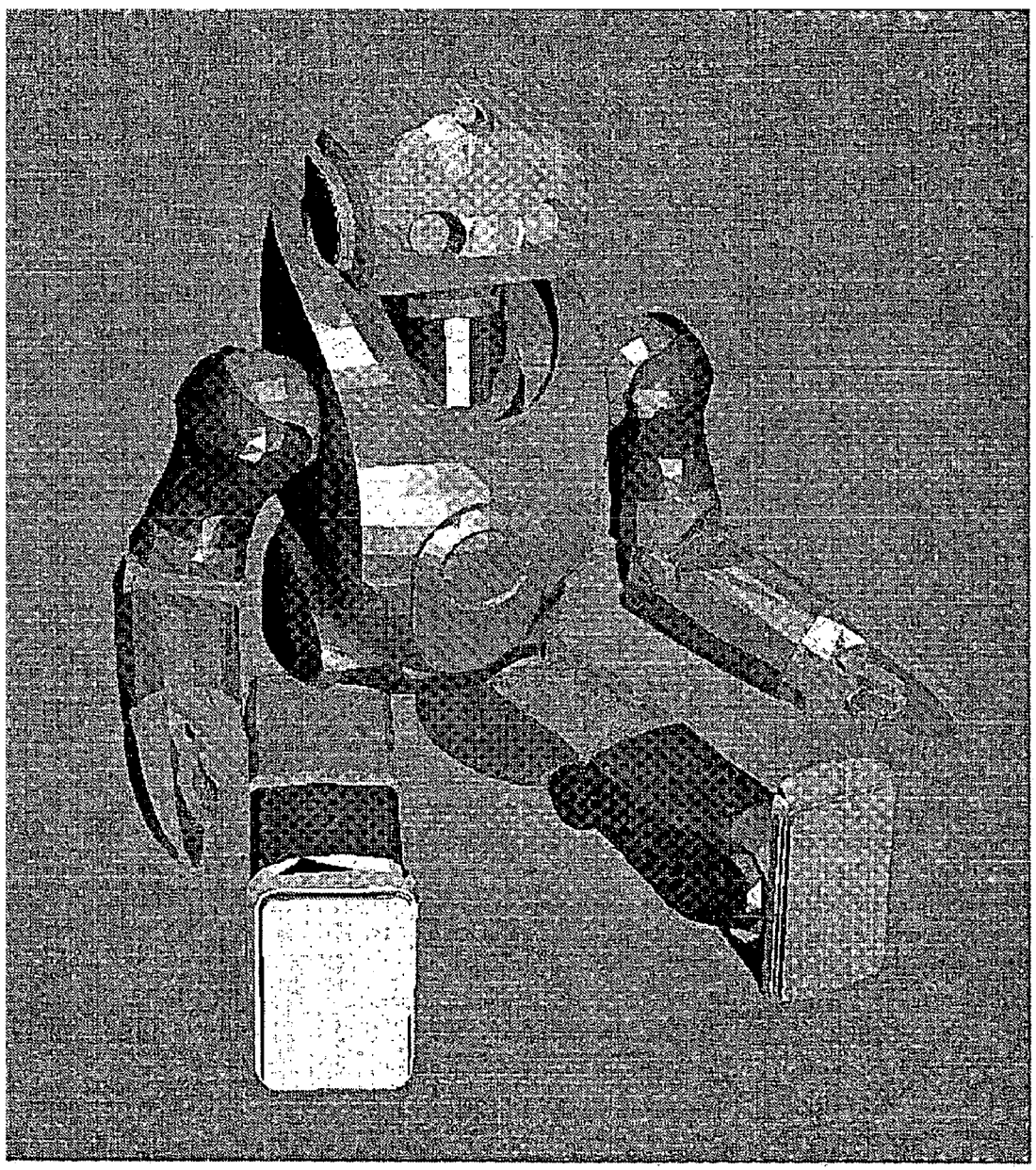
FIG. 1 illustrates the external structure of a robot apparatus to which a force control according to an embodiment of the present invention is applied.

FIG. 1 illustrates the external structure of a robot apparatus to which the force control according to an embodiment of the present invention is applied. Two legs serving as moving means are connected to a pelvis portion. Also, an upper body is connected to the pelvis portion via a waist joint. Two arms are connected to the upper body. A head is also connected to the upper body via a neck joint.

Each of the left and right legs has three degrees of freedom at the hip joint, one degree of freedom at a knee joint, and two degrees of freedom at an ankle joint. That is, each of the left and right legs totally has six degrees of freedom. In addition, each of the left and right arms has three degrees of freedom at a shoulder joint, one degree of freedom at an elbow joint, and two degrees of freedom at a wrist joint. That is, each of the left and right arms totally has six degrees of freedom. Each of the neck joint and the waist joint has three degrees of freedom about the X, Y, and Z axes.

An actuator for driving each of joint shafts includes, for example, a DC brushless motor, a speed reducer, and a position sensor for detecting the rotational position of an output shaft of the speed reducer. These joint driving actuators are connected to a host computer for performing total control of the operation of the robot apparatus. The joint driving actuators can receive the position control target values from the host computer and can send the current output torques, the angles of the joints, and the angular velocities of the joints to the host computer.

Figure 2:
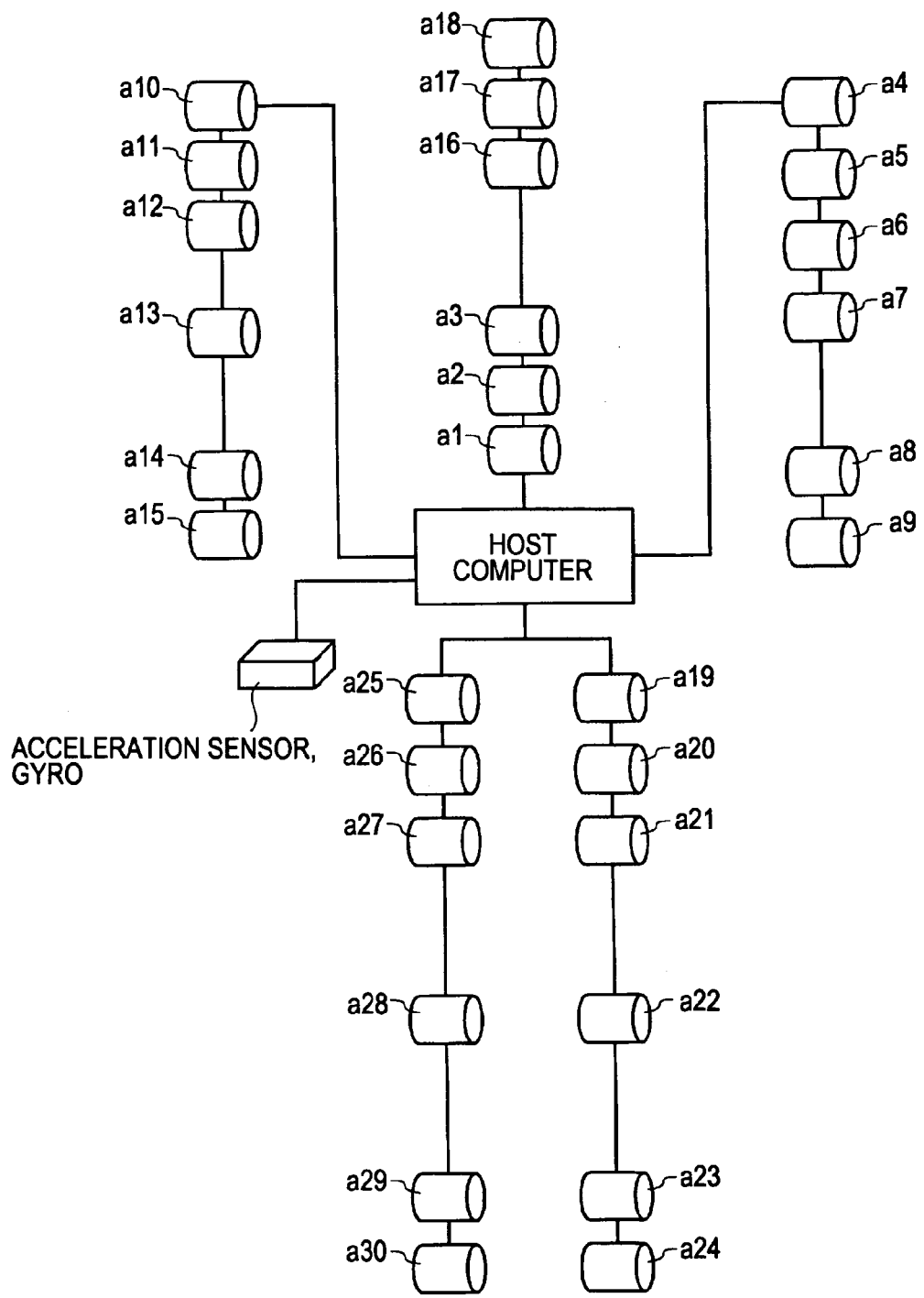
FIG. 2 illustrates the electrical connection topology of the robot apparatus shown in FIG. 1.
Figure 3:
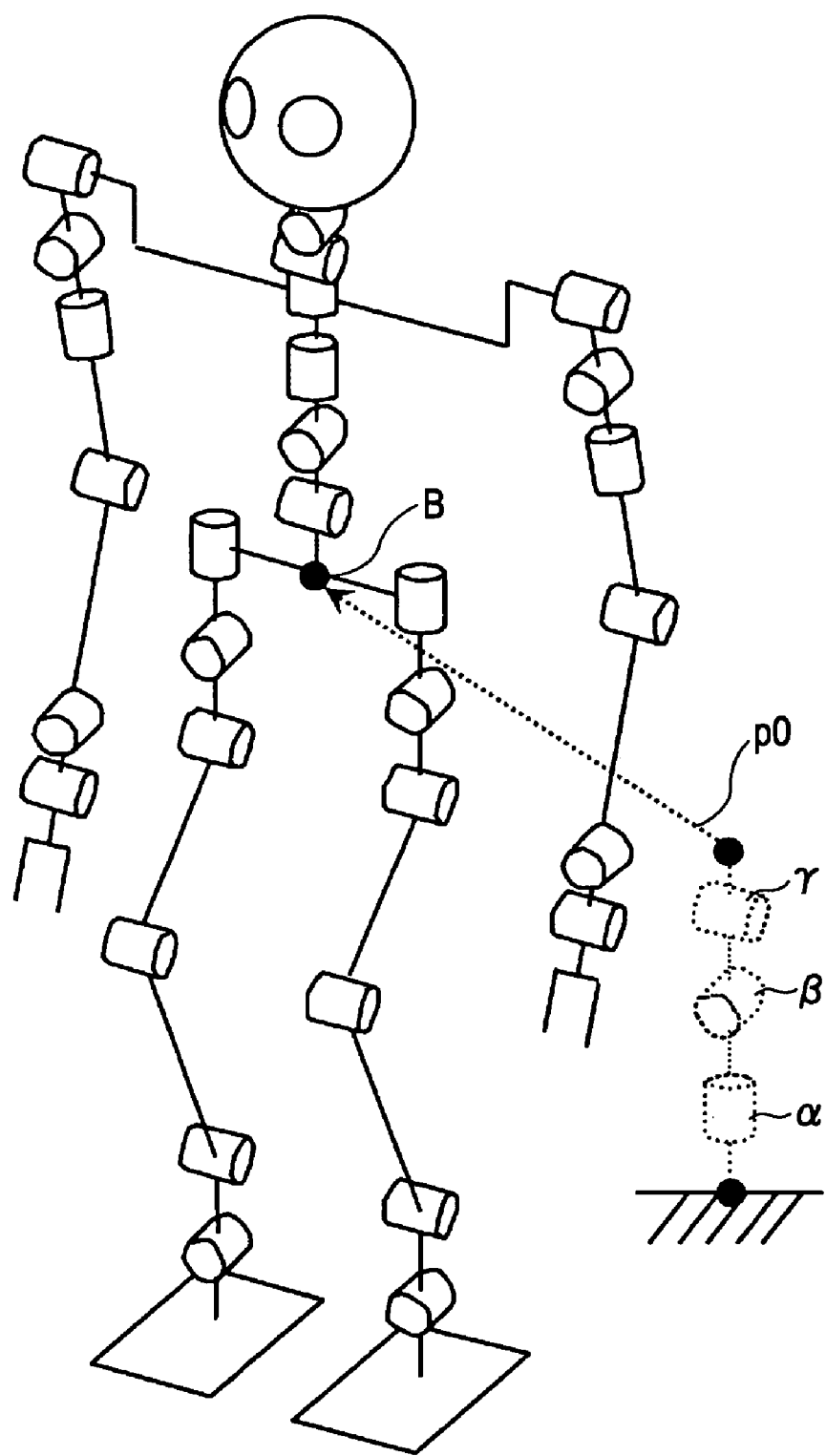
FIG. 3 illustrates the degree-of-freedom model of the joints of the robot apparatus shown in FIG. 1.

FIG. 2 illustrates the electrical connection topology of the robot apparatus shown in FIG. 1. FIG. 3 illustrates the degree-of-freedom model of the joints of the robot apparatus shown in FIG. 1.

The body of the robot apparatus includes waist joint actuators a1, a2, and a3 for three axes and neck joint actuators a16, a17, and a18 for three axes. These joint actuators are connected to the host computer in series. Each of the joint actuators receives the position control target value from the host computer via a serial cable and sends the current output torque, the angle of the joint, and the angular velocity of the joint to the host computer.

Additionally, the left arm of the robot apparatus includes shoulder joint actuators a4, a5, and a6 for three axes and an elbow joint actuator a7 for one axis, and two wrist joint actuators a8 and a9 for two axes. These joint actuators are connected to the host computer in series. Similarly, the right arm of the robot apparatus includes shoulder joint actuators a10, a11, and a12 for three axes and an elbow joint actuator a13 for one axis, and two wrist joint actuators a14 and a15 for two axes. These joint actuators are also connected to the host computer in series.

Additionally, the left leg of the robot apparatus includes hip joint actuators a19, a20, and a21 for three axes, a knee actuator a22 for one axis, and two ankle joint actuators a23 and a24 for two axes. These joint actuators are connected to the host computer in series. Similarly, the right leg of the robot apparatus includes hip joint actuators a25, a26, and a27 for three axes, a knee actuator a28 for one axis, and two ankle joint actuators a29 and a30 for two axes. These joint actuators are connected to the host computer in series.

Each of the actuators a1 to a30 used for individual joints includes, for example, a DC brushless motor, a speed reducer, and a position sensor for detecting the rotational position of an output shaft of the speed reducer. These actuators drivingly rotate in accordance with the position control target values externally provided and output the current output torques, the angles of the joints, and the angular velocities of the joints. This type of joint actuator is described in, for example, Japanese Unexamined Patent Application Publication No. 2004-181613 that has been already assigned to the present applicant.

As can be seen from FIG. 3, a biped mobile robot can be expressed as an open link tree structure having a pelvis B as a base.

A mobile robot can freely move in the world space and can change the orientation. Accordingly, if the Euler angle $\alpha=(\alpha, \beta, \gamma)^T$ and the position $p_0(p_{0x}, p_{0y}, p_{0z})^T$ of the pelvis B are introduced as state variables for indicating the entire state of the robot, then the robot can be represented as a link structure in which a plurality of rigid bodies are linked. Consequently, the motion equation of the robot can be expressed as follows:

$$\tau = H\ddot{q} + b - J^T f \quad (3)$$

Here, q denotes a generalized variable of the entire robot. The generalized variable q includes a vector indicating the motion state of the robot in which the orientation $\alpha$ and the positions $p_0$ of the base are lined up and a vector $\theta$ in which all of the joint values indicating the current states of the actuators are lined up. That is, q represents a kinetic model of the robot serving as a link structure and is expressed as follows:

$$q = (\alpha, p_0, \theta)^T \quad (4)$$

Additionally, in equation (3), $\tau$ denotes the generalized force corresponding to the generalized variable q. The elements corresponding to $\alpha$ and $p_0$ are zero (since actuators that generate the forces are not present). The element corresponding to $\theta$ is equal to a force generated by the actuators that drive individual joints. H denotes an inertia matrix of the entire robot and b denotes the force of gravity or the Coriolis force. f denotes an external force. J denotes the Jacobian matrix for associating the velocity generated in the external force acting direction with the generalized velocity which is the temporal differentiation of the generalized variable q. Thus, the following equation is satisfied:

$$\dot{x} = J\dot{q} \quad (5)$$

Solution of Inverse Operational Space Inertia Matrix

The present embodiment provides the solution of the inverse operational space inertia matrix that satisfies the requirement for a high-speed computation and the reduction of the computational load by applying a forward dynamics calculation used for obtaining the generalized acceleration (joint acceleration) from the generalized force (joint force) of a link structure. The forward dynamics calculation is a core calculation used for a kinetic simulation. Research for speeding up the forward dynamics calculation has been intensely carried out. In addition, several methods for performing the forward dynamics calculation in parallel have been developed. The present embodiment provides a highly efficient solution of an inverse operational space inertia matrix by using the excellent forward dynamics calculation.

As noted above, the motion equation of the entire link structure in which a plurality of rigid bodies are linked can be expressed as follows:

$$\tau = H\ddot{q} + b - J^T f \quad (6)$$

where $\tau$ denotes the generalized force corresponding to the generalized variable q, b denotes the force of gravity or the Coriolis force, and f denotes an external force exerted on the operational space. Equation (6) can be rewritten as follows:

$$\ddot{x} = \Lambda^{-1} f + c \quad (7)$$

where c denotes the operational-space bias acceleration (the acceleration generated in an operational space when no external forces act on the operational space). The operational-space bias acceleration c is expressed as follows:

$$c = JH^{-1}(\tau - b) + \dot{J}\dot{q} \quad (8)$$

Obtaining the left-hand side from the right-hand side of equation (7) means obtaining the acceleration in the operational space when an external force, a generalized force, the force of gravity, and a force relating to a velocity product (such as the Coriolis force) are exerted on the operational space. Although obtaining the acceleration in the operational space is not included in the normal forward dynamics calculation, this calculation can be considered to be one type of forward dynamics calculation. In forward dynamics calculation FWD, a joint model defining a kinetic model of a link structure, the velocities of the joints, a joint torque $\tau$ defining a generalized force, the acceleration g due to gravity, and an external force f are used as parameters. The forward dynamics calculation FWD can be expressed as follows:

$$\ddot{x} = FWD(q, \dot{q}, \tau, g, f) \quad (9)$$

According to the forward dynamics calculation FWD, an acceleration generated at any point of a link structure can be obtained from the information about forces that are exerted on a link structure (such as the generalized variable q corresponding to the kinetic model of the link structure, a generalized force $\tau$, the force g of gravity, and an external force f). Here, in equation (9), under the constraint conditions that make all the forces except for the generalized variable q and the external force f among the input parameters of the forward dynamics calculation FWD zero, acceleration generated in the operational space can be obtained unless the force of gravity, a joint force, and a force relating to a velocity product (such as the Coriolis force) occur. That is, in equation (8), the bias acceleration c can be zero (c=0). Furthermore, when the calculation is performed under the condition that $f = e_i$, that is, when a unit external force is applied to only the ith operational space, the ith column of the inverse operational space inertia matrix $\Lambda^{-1}$ can be obtained. Accordingly, by computing the following equation (10) for every row i, the inverse operational space inertia matrix $\Lambda^{-1}$ can be obtained.

$$i\text{th column of } \Lambda^{-1} = FWD(q, 0, 0, 0, e_i) \quad (10)$$

Additionally, if the forward dynamics calculation FWD in equation (9) is computed under the conditions in which an external force=0 and only forces generated at joints, the velocities of the joints, and the force of gravity are exerted, the operational-space bias acceleration c can be extracted as follows:

$$c = FWD(q, \dot{q}, \tau, g, 0) \quad (11)$$

In summary, by carrying out the forward dynamics calculation FWD using equations (10) and (11) and the generalized variable q defining a kinetic model of a link structure, the inverse operational space inertia matrix $\Lambda^{-1}$ and the operational-space bias acceleration c, which are important physical quantities of the operational space, can be obtained.

Method for Constructing Calculation Model for Inverse Operational Space Inertia Matrix Using Forward Dynamics Calculation A method for constructing a computing apparatus for computing the inverse operational space inertia matrix $\Lambda^{-1}$ and the associated operational-space bias acceleration c is described in detail below with reference to an example of a specific forward dynamics calculation. Initially, in general, the forward dynamics calculation used to be carried out using an inverse dynamics calculation (a calculation for obtaining a force from acceleration). However, the computational amount $O(N^3)$ is needed. If the number of degrees of freedom increases, the computational amount also increases. Research has advanced in recent years, and therefore, the computational amount $O(N)$ can be achieved using a single central processing unit (CPU) and the computational amount $O(\log(N))$ can be achieved using multiple CPUs in parallel.

According to the present embodiment, a method for constructing a calculation model using a single CPU ($O(N)$) and the articulated body method is employed. The articulated body method is described in, for example, "The calculation of robot dynamics using articulated-body inertias", The International Journal of Robotics Research, vol. 2, no. 1, pp. 13-30, 1983. In this embodiment, the articulated body method is divided into the following four steps: an inertia information computing step, a velocity information computing step, a force information computing step, and an acceleration information computing step.

Inertia Information Computing Step

The inertia information is obtained by computing the following equation (12) for every $I^A_i$ (articulated body inertia) of a link from the terminal end to the base of the robot apparatus:

$$I^A_i = I_i + \Sigma_{j \in C(i)} \{I^A_j - I^A_j S_j (S^T_j I^A_j S_j)^{-1} S^T_j I^A_j\} \tag{12}$$

where $I_i$ denotes the inertia of a link i, $C(i)$ denotes the index set of child links of the link i, and $S_j$ denotes a matrix indicating the number of degrees of freedom of motion of a joint of a link j.

Velocity Information Computing Step

The velocity information can be obtained by computing the following equation (13) for every velocity of the origin of a link from the terminal end to the base of the robot apparatus:

$$v_i = v_p + S_i \dot{q}_i \tag{13}$$

where $v_i$ denotes the velocity of a link i, p denotes an index of the parent link of the link i, $S_i$ denotes a matrix indicating the degree of motion freedom of the joint of the link i, and $q_i$ denotes the joint value of the link i.

Force Information Computing Step

Figure 4:
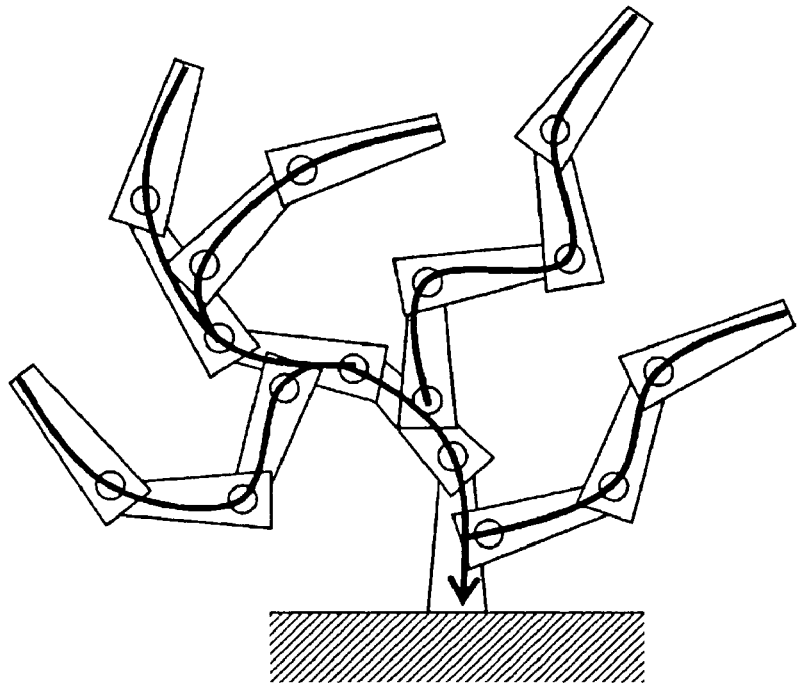
FIG. 4 illustrates a normal route for computing force information from a terminal end to a base of a multi-link apparatus installed on a floor.

The force information can be obtained by computing the following equations (14) and (15) for every bias force $P^A_i$ of a link from the terminal end to the base of the robot apparatus. FIG. 4 illustrates a normal route for computing the force information from the terminal end to the base of a multi-link apparatus installed on a floor.

$$p^A_i = v_i \times I_i v_i - \Sigma_{k \in F(i)} f_k + \Sigma_{j \in C(i)} \{p_j + I^A_j S_j (S^T_j I^A_j S_j)^{-1} (\tau_j - S^T_j p_j)\} \tag{14}$$

$$p_i = p^A_i + I^A_i \dot{S}_i \dot{q}_i \tag{15}$$

where $f_k$ denotes the kth external force in the link i, $F(i)$ denotes the index set of external forces exerted on the link i, and $\tau_i$ denotes a joint force of the link i.

Acceleration Information Computing Step

Figure 5:
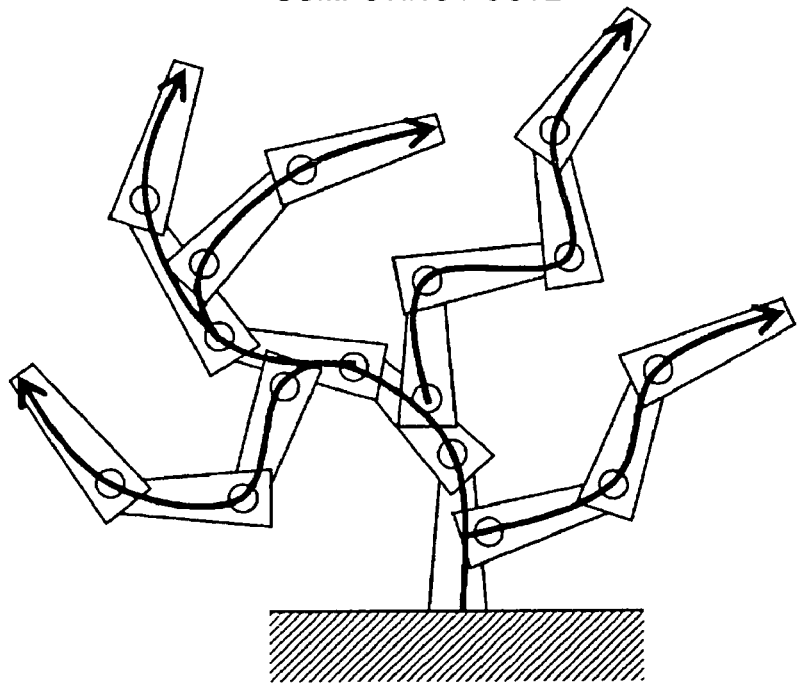
FIG. 5 illustrates a normal route for computing acceleration information from a base to a terminal end of a multi-link apparatus installed on a floor.

The acceleration information can be obtained by computing the following equations (16) and (17) for every acceleration $a_i$ of a link from the base to the terminal end of the robot apparatus. FIG. 5 illustrates a normal route for computing the acceleration information from the base to the terminal end of a multi-link apparatus installed on a floor.

$$\ddot{q}_i = (S^T_i I^A_i S_i)^{-1} \{\tau_i - S^T_i (I^A_i \alpha_p + p_i)\} \tag{16}$$

$$\alpha_i = \alpha_p + \dot{S}_i \dot{q}_i + S_i \ddot{q}_i \tag{17}$$

As a result of the above-described calculations, the acceleration of the physical quantity x occurring in the direction of a unit external force n exerted on the link i can be freely obtained using the following equation:

$$\ddot{x} n^T (\alpha_i + g) \tag{18}$$

It is noted that, in the above-described calculation, the velocity $V_o$ of the base, which is the origin of calculation of the velocity information, is zero ($V_o = 0$). Additionally, the effect of the force of gravity is taken into account such that the base is raised with the acceleration due to gravity in the acceleration computing step as follows:

$$a_o = g \tag{19}$$

By dividing the forward dynamics calculation into the four steps and performing the inertia information computing step, the velocity information computing step, the force information computing step, and the acceleration information computing step in this order, the acceleration occurring at any location in any direction of a link structure, such as a legged mobile robot, can be obtained when any force is applied to the link structure. As described above, since the forward dynamics calculation can be freely applied to a plurality of forces at the same time and can compute accelerations occurring at a plurality of points, the forward dynamics calculation can be easily applied to the calculation of the inverse operational space inertia matrix even when an operational space relates to the positions and orientations of a plurality of points of a structure.

Optimization of Forward Dynamics Calculation

As described above, the result of the forward dynamics calculation indicated by equation (9) is obtained. By applying this calculation in the form of equation (10) and (11), the inverse operational space inertia matrix $\Lambda^{-1}$ and the operational-space bias acceleration c can be calculated. However, waste of computational time is still included. Therefore, to calculate these values, it is desirable that a more optimized calculation method is provided for each computing step.

Optimization of Inertia Information Computing Step

As noted above, the inertia information can be obtained by computing equation (12) for every link from the terminal end to the base of a link structure. As can be seen from equation (12), the inertia information does not change unless the orientation of the link structure (i.e., the joint value) changes. Since the joint value q, which is a generalized variable, is common for the inverse operational space inertia matrix according to equation (10) and the operational-space bias acceleration according to equation (11) and does not change, only one calculation of equation (12) for calculating the inertia information is needed.

Optimization of Velocity Information Computing Step

When the inverse operational space inertia matrix according to equation (10) is computed, all of the joint velocities are set to zero. Thus, $v_i = 0$. Accordingly, equation (13) for computing the velocity information need not be performed. Equation (13) should be performed only when the operational-space bias acceleration is computed according to equation (11).

Optimization of Force Information Computing Step

When the inverse operational space inertia matrix according to equation (10) is computed, the velocities of the joints and forces generated at the joints are zero. Accordingly, equations (14) and (15) for computing the force information is simplified by substituting $\dot{q}_i=0$ and $\tau_i=0$ into equations (14) and (15) as follows:

$$p^A_i = -\Sigma_{k \in F(i)} f_k + \Sigma_{j \in C(i)} \{p_j - I^A_j S_j (S^T_j I^A_j S_j)^{-1} S^T_j p^A_j\} \quad (20)$$

Figure 6:
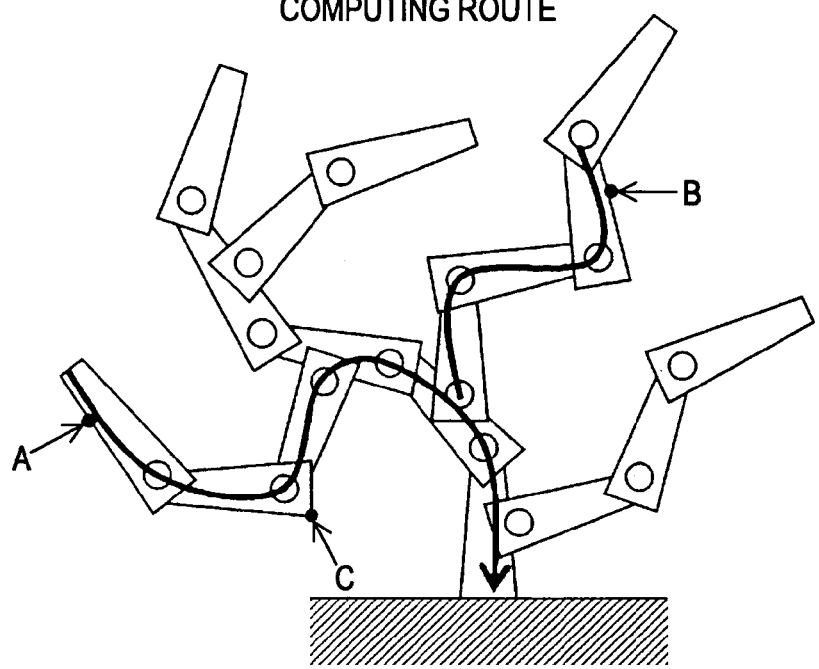
FIG. 6 illustrates an optimized route for computing the force information from a terminal end to a base of a multi-link apparatus installed on a floor.

Furthermore, since it is apparent that $p^A_i=0$ for a link that is not on the route from the point of application of force to the base, computation of equation (20) is performed only for links that are on the route from the point of application of force to the base. FIG. 6 illustrates an optimized route for computing the force information from the terminal end to the base when forces are applied to points A, B, and C of a multi-link apparatus installed on a floor. As shown in FIG. 6, computation for a link that is not on the route from the point of application of force to the base is eliminated.

In contrast, in equation (11) for computing the operational-space bias acceleration, $f_k=0$. Accordingly, the term of $f_k$ can be eliminated from equations (14) and (15) for computing the force information. However, in terms of a computing route, computation of equation (11) is performed for all of the links, as shown in FIG. 4.

Optimization of Acceleration Information Computing Step

When the inverse operational space inertia matrix according to equation (10) is computed, equations (16) and (17) for computing the acceleration information are simplified to the following equations by substituting $\dot{q}_i=0$ and $\tau_i=0$ and taking into account the optimization result of the force information computation step:

$$\ddot{q}_i = -(S^T_i I^A_i S_i)^{-1} S^T_i (I^A_i \alpha_p + p^A_i) \quad (21)$$

$$\alpha_i = \alpha_p + S_i \ddot{q}_i \quad (22)$$

Here, $p^A_i=0$ if i is not present on the route for computing the force information. In addition, $g=0$ in the term containing the acceleration due to gravity.

Figure 7:
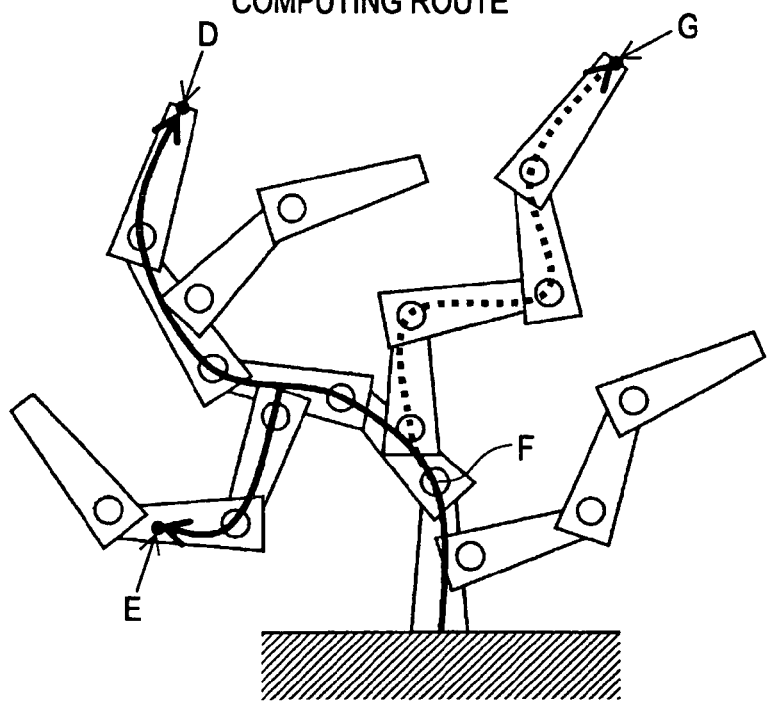
FIG. 7 illustrates an optimized route when accelerations occurring at given points of a multi-link apparatus installed on a floor are computed from a base to a terminal end.

FIG. 7 illustrates an optimized route when accelerations occurring at three points D, E, and F of a multi-link apparatus installed on a floor are computed from the base to the terminal end. As shown in FIG. 7, the links with cross-hatchings are the links on the route used for computing the force information when forces are applied to the points A, B, and C, as shown in FIG. 6. As can be seen from FIG. 7, substitution of the value of $p^A_i$ into a link for which the force information computation has been executed is performed and this acceleration calculation is performed. However, the substitution is not carried out for the other links, since $p^A_i=0$. Thus, the acceleration calculation is eliminated.

Subsequently, when the acceleration of a point G shown in FIG. 7 is calculated, the acceleration does not change unless the force information is changed. Accordingly, in FIG. 7, the point F for which the acceleration calculation has already been executed is considered to be a starting point. The acceleration can be additionally updated along the route from the point F to the point G.

In contrast, for equation (11) for computing the operational-space bias acceleration, there are no terms that can be eliminated from equations (16) and (17). However, unlike the normal route for computing the acceleration information shown in FIG. 5, the acceleration information computation is not necessary for all of the links. Like the calculation for the inverse operational space inertia matrix, as shown in FIG. 7, the acceleration calculation is needed only on the route from the base to the link for calculating the acceleration. When the acceleration calculation is carried out for an additional link, the acceleration calculation can be added from the link that is the closest to the link for which the acceleration calculation has been executed, as in the calculation for the inverse operational space inertia matrix.

As described above, by optimizing each of the four steps of the forward dynamics calculation, the forward dynamics calculation can be applied to the case where one operational space relates to the positions and orientations of a plurality of points of a structure. In addition, the inverse operational space inertia matrix can be calculated at high speed.

Application to Simple Example

Figure 17:
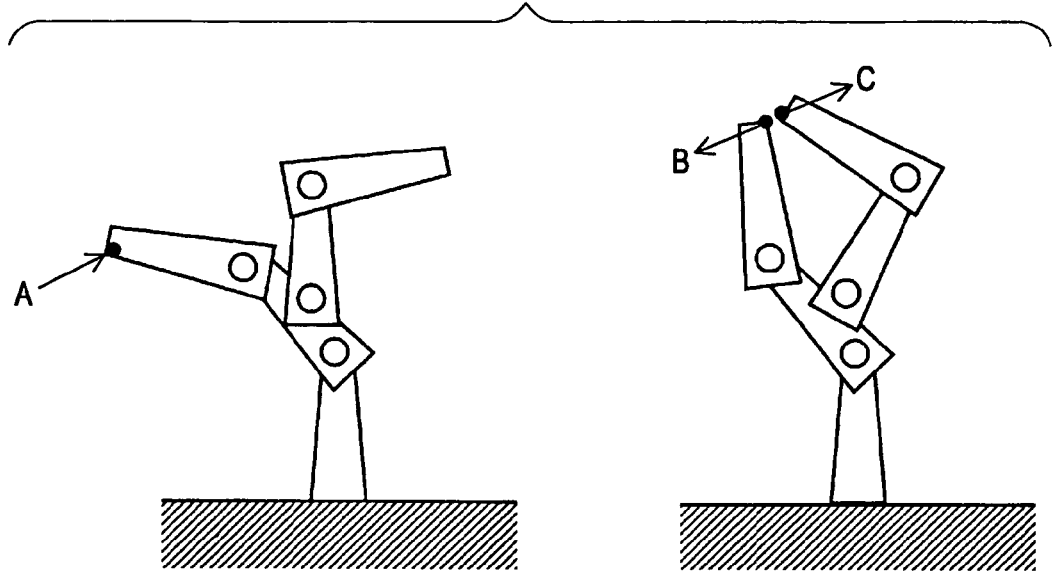
FIG. 17 illustrates the structure of a multi-axis robot.

Here, as shown by the case in FIG. 17 in which a collision (self-interference) occurs between the points B and C, in an apparatus installed on a floor and having a relatively simple link structure, a procedure for calculating the inverse operational space inertia matrix using the above-described method is as follows:

Step 1: computing inertia information by carrying out computation of equation (12) for all of links from the terminal end to the base;

Step 2: regarding the calculation for velocity information to be unnecessary when calculating the inverse operational space inertia matrix;

Step 3: computing force information by carrying out computation of equation (20), from the terminal end to the base, for a link in routes from the point B to the base and from the point C to the base when a unit force is applied to the points B and C;

Step 4: computing acceleration information by carrying out computation of equations (21) and (22) from the terminal end to the base (note that the acceleration g due to gravity at the starting point is set to zero); and Step 5: applying equation (18) to the points B and C and computing the difference between the results so as to obtain the inverse operational space inertia matrix relating to the relative movement between the points B and C (note that the acceleration g due to gravity is set to zero).

A procedure for computing the operational-space bias acceleration is as follows:

Step 1: regarding update of the inertia information to be unnecessary since the inertia information has been obtained in the inverse operational space inertia matrix calculation;

Step 2: computing velocity information by carrying out computation of equation (13) for all of links from the base to the terminal end;

Step 3: computing force information by carrying out computation of equation (14) for all of links from the terminal end to the base when a generalized force $\tau$ is applied to all of the links;

Step 4: computing acceleration information by carrying out computation of equations (16) and (17) from the base to the points B and C; and Step 5: applying equation (18) to the points B and C and calculating the difference between the results so as to obtain the bias acceleration relating to the relative movement between the points B and C.

In this way, according to this embodiment of the present invention, the inverse operational space inertia matrix and the bias acceleration can be efficiently obtained even when one operational space relates to the positions and orientations of a plurality of points of the structure.

Application to Operational Space of Center of Gravity

As a more complicated example, according to the present embodiment, the inverse operational space inertia matrix for the operational space of the center of gravity can be also efficiently calculated.

The barycentric velocity is defined as follows:

$$\dot{x}_g = \sum \frac{m_i}{M} \dot{x}_{gi} \quad (23)$$

where $x_g$ denotes the center of gravity of the link structure, $X_{gi}$ denotes the center of gravity of a rigid body i, M denotes the mass of the entire link structure, and $m_i$ denotes the mass of the rigid body i.

Accordingly, the transposed Jacobian matrix of the center of gravity can be defined as follows:

$$J_g^T = \sum \frac{m_i}{M} J_{gi}^T \quad (24)$$

where $J_g$ denotes the center-of-gravity Jacobian of the entire link structure and $J_{gi}$ denotes the center-of-gravity Jacobian of a rigid body i.

Figure 18:
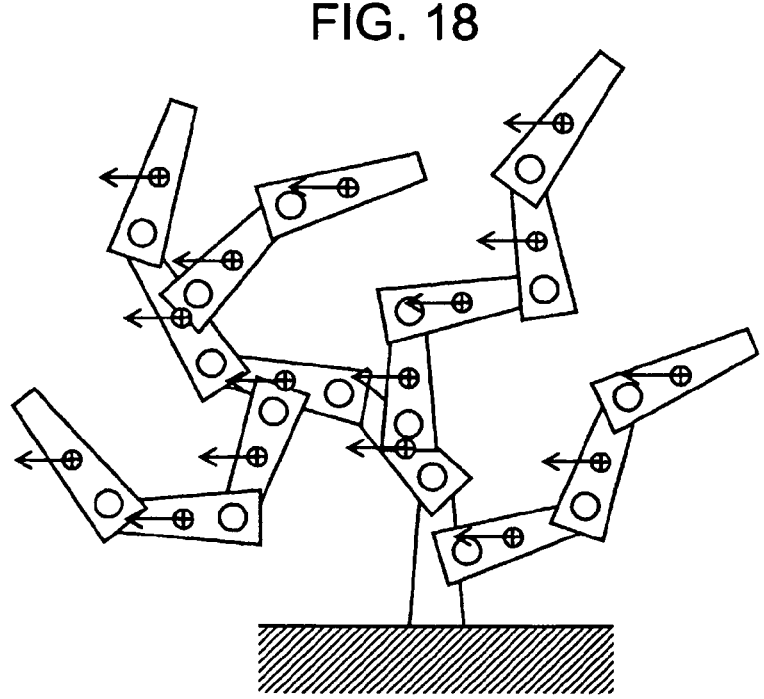
FIG. 18 is a diagram in which a force corresponding to one operational space acts on the centers of gravity of all of links.

As can be seen from equation (24), a unit force can be applied to the center of gravity of the structure including a plurality of rigid links shown in FIG. 18 by applying an $m_i/M$ unit force to each rigid body. At that time, the inverse operational space inertia matrix can be obtained by computing the acceleration occurring at the center of gravity using the following equation:

$$\ddot{x}_g = \sum \frac{m_i}{M} \ddot{x}_{gi} \quad (25)$$

Consequently, the inverse operational space inertia matrix for the operational space of the center of gravity can be obtained according to the following procedure:

Step 1: computing inertia information by carrying out computation of equation (12) for all of links from the terminal end to the base;

Step 2: regarding velocity information to be unnecessary when the inverse operational space inertia matrix is computed;

Step 3: computing force information by carrying out computation of equation (20) for all of links from the terminal end to the base when an $m_i/M$ unit force (in a direction of the operational space) is applied to all of the links, as shown in FIG. 18;

Step 4: computing acceleration information by carrying out computation of equations (21) and (22) from the base to the points B and C (note that the acceleration due to gravity at the starting point is set to zero); and Step 5: applying equation (18) to the center of gravity of each rigid body i to calculate the acceleration of the center of gravity $X_{gi}$ and calculating the acceleration occurring at the center of gravity of the entire link structure so as to obtain the inverse operational space inertia matrix (note that the acceleration due to gravity is set to zero).

As shown in this example, according to the present embodiment, the inverse operational space inertia matrix can be efficiently obtained even when a plurality of forces should be applied at the same time.

Application to Operational Space of Angular Momentum

Important examples of application according to the present embodiment include computation of the inverse operational space inertia matrix relating to the angular momentum. Accordingly, this computation is described in detail below.

The angular momentum about the center of gravity can be defined as follows:

$$L = \sum \{m_i(x_g - x_{gi}) \times \dot{x}_{gi} + I_i \omega_i\} \quad (26)$$

where L denotes the angular momentum of the entire link structure and $\omega_i$ denotes the angular velocity of a rigid body i.

Accordingly, the transposed Jacobian matrix of the angular momentum can be defined as follows:

$$J_L^T = \sum \{J_{gi}^T[-m_i(x_g - x_{gi}) \times] + J_{\omega i}^T I_i\} \quad (27)$$

where $J_L$ is the Jacobian matrix of the angular momentum of the entire link structure and $J_{\omega i}$ denotes the Jacobian matrix of the angular velocity of a rigid body i.

As can be seen from equation (27), a unit force can be applied to the operational space of the angular momentum by applying a force obtained by multiplying the operational space of the angular momentum by a cross product $[-m_i(X_{gi} - X_g) \times]$ and a moment obtained by multiplying the operational space of the angular momentum by $I_i$ to the center of gravity of each rigid body. At that time, by calculating the acceleration occurring in the operational space of the angular momentum using the following equation (28), the inverse operational space inertia matrix can be obtained:

$$\dot{L} = \sum \{m_i(\ddot{x}_g - \ddot{x}_{gi}) \times \dot{x}_{gi} + m_i(x_g - x_{gi}) \times \ddot{x}_{gi} + \omega_i \times I_i \omega_i + I_i \dot{\omega}_i\} \quad (28)$$

According to the present embodiment, the inverse operational space inertia matrix can be efficiently obtained even when a plurality of forces and moments should be applied at the same time.

Application to Control of Fullbody Motion

As described above, according to the present embodiment, computation of the inverse operational space inertia matrix calculation having high versatility and high speed can be achieved. When the fullbody motion of a legged mobile robot is performed under the force control, tasks need to be performed while taking into account many constraint conditions. By applying the present embodiment, even the processing speed of currently available computers can be used to achieve the fullbody motion of the legged mobile robot.

Figure 8:
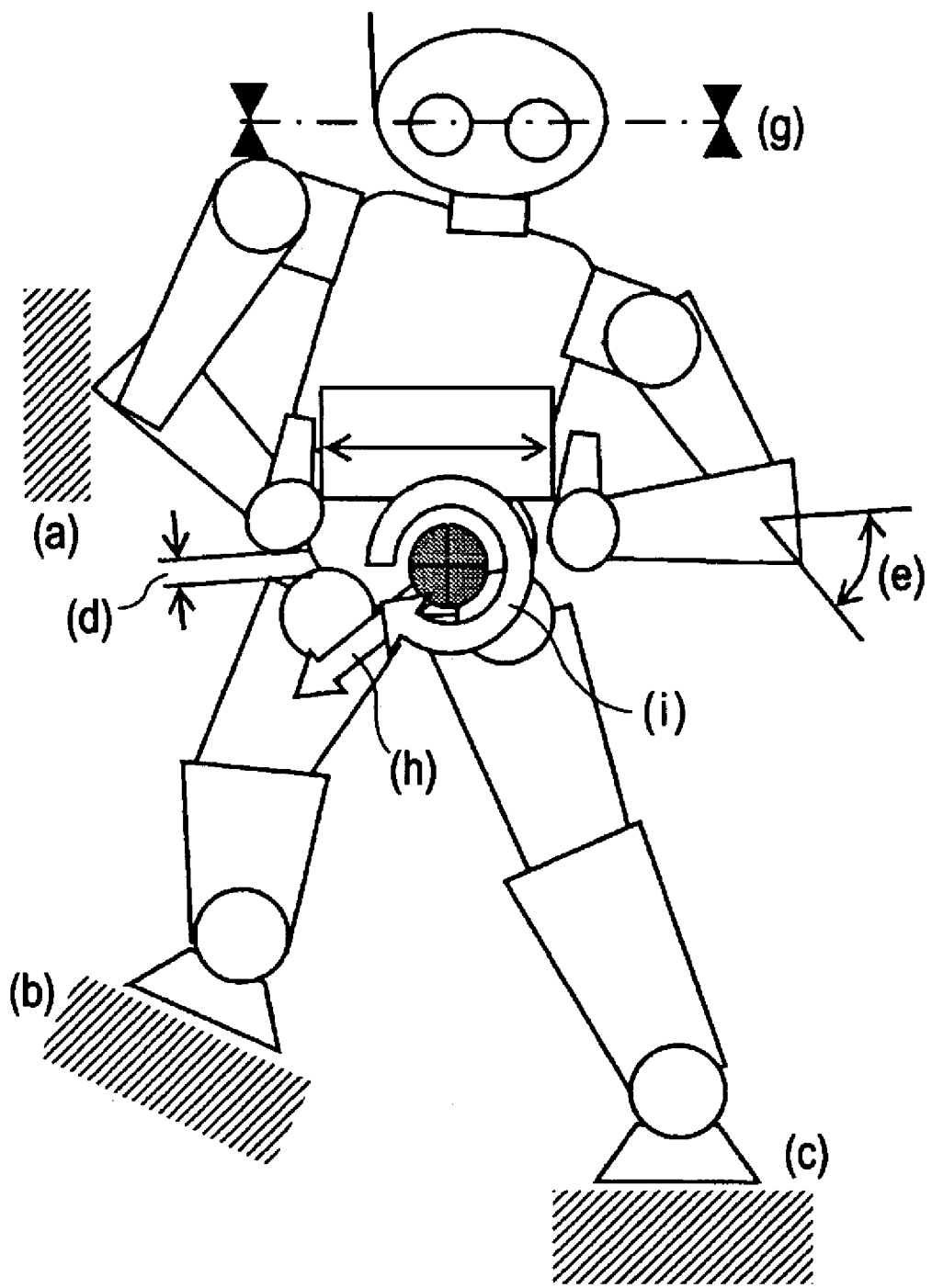
FIG. 8 illustrates the constraint conditions that should be taken into account when a legged mobile robot carries out the fullbody motion.

FIG. 8 illustrates the constraint conditions that should be taken into account when a legged mobile robot carries out the fullbody motion. Sections (a), (b), and (c) of FIG. 8 indicate constraints relating to the interface with the environment. Section (d) indicates a constraint relating to the self-interference. These constraints define the operational spaces in directions of a vertical reaction force and a frictional force. Section (e) indicates a constraint relating to the available range of movement of a joint. This constraint defines an operational space in the rotational direction of the joint. Section (f) indicates a constraint relating to the motion of the wrist with respect to an object. This constraint defines an operational space in the direction of the position of the end-effector relative to the object and the orientation. Section (g) indicates a constraint for maintaining head cameras horizontal. This constraint defines an operational space relating to the orientation of the head in an absolute space. Section (h) indicates a constraint relating to the center of gravity. This constraint defines an operational space relating to the center of gravity. Section (i) indicates a constraint relating to the angular momentum. This constraint defines an operational space relating to the angular momentum.

Let x denote a variable collectively indicating all of these operational spaces. Then, all of the constraints can be expressed as the following linear constraint condition including inequality expressions:

$$\ddot{x} = \Lambda^{-1} f + c \quad (29)$$

$$f_{N_i} \geq 0, \ddot{x}_{N_i} \geq 0 \quad (30)$$
and
$$f_{N_i} \ddot{x}_{N_i} = 0$$

$$|f_{F_i}| \leq \mu_i f_{N_i}, f_{F_i} \ddot{x}_{RF_i} \leq 0 \quad (31)$$
and
$$\ddot{x}_{F_i}(\mu_i f_{N_i} - |f_{F_i}|) = 0$$

Here, $f_{Ni}$ and $f_{Fi}$ that appear in equations (30) and (31), respectively, denote the external force and the frictional force in the normal direction at a point i of application of force caused by the constraint relating to the interface with an external world, as shown by the sections (a), (b), and (c) of FIG. 8. $\mu_i$ denotes the coefficient of friction at the point i of application of force.

Equations (29) to (30) are known as a linear complementarity problem. If the inverse operational space inertia matrix $\Lambda^{-1}$ and the operational-space bias acceleration c are known, the acceleration of the variable x and the force f that satisfy the conditions can be determined by solving this linear complementarity problem. The mathematical method for solving a linear complementarity problem is described in, for example, "Fast Contact Force Computation for Nonpenetrating Rigid Bodies," Proceedings of SIGGRAPH '94, pp. 23-34, 1994. Therefore, a description of the method is not repeated here.

Most of the time-consuming part of the calculation for obtaining the acceleration of the variable x and the force f (for solving the linear complementarity problem) is the part for calculating the inverse operational space inertia matrix $\Lambda^{-1}$. As noted above, according to the present embodiment, since high-speed calculation of the inverse operational space inertia matrix can be performed even for a variety of operational spaces, a real-time processing for an actual robot can be achieved. In this way, after the force f is obtained, a joint force τ that satisfies the constraint solved as described above can be determined using the operational space control (see Non-patent document 1) as follows:

$$\tau = J^T f + (I - J^\# J)^T \tau_{null} \quad (32)$$

In equation (32), $\tau_{null}$ denotes a joint force provided using a constraint with a priority that is lower than the priority of the constraint indicated by f. $J^\#$ denotes one type of generalized inverse matrix of J. By recursively using equation (32) among a plurality of constraint condition groups, a priority can be assigned to each of the constraint condition groups.

Application to Construction and Operation of Virtual Space

According to the present embodiment, the method for computing the inverse operational space inertia matrix is applicable to many technical fields including kinetic simulation, computer animation, posture editing, and external force estimation in addition to the force control of a robot. For example, this method is also effective when a plurality of objects coexist in a virtual environment and a real-time kinetic simulation is carried out in order to reconstruct physical interactions (e.g., collisions and contacts) among the objects or when a plurality of objects coexist in a virtual environment and the objects are operated.

Kinetic calculation in a kinetic simulation can be performed by applying a force between objects to the forward dynamics calculation (see Non-patent document 2) as an external force.

Figure 9C:
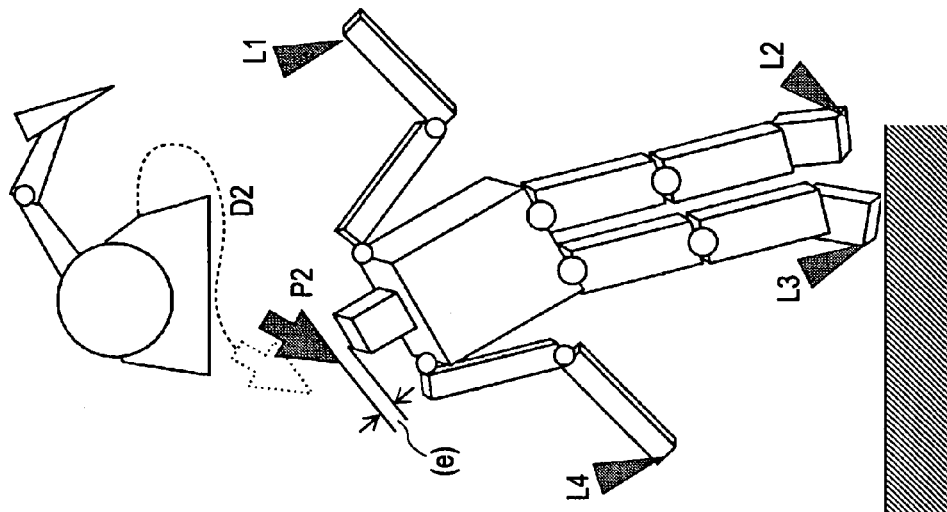
FIGS. 9A-9C illustrate objects on which physical interactions, such as collisions and contacts, are applied.
Figure 9B:
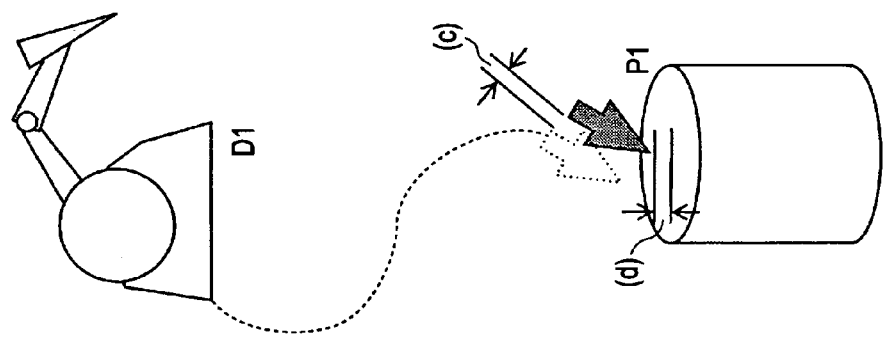
Figure 9A:
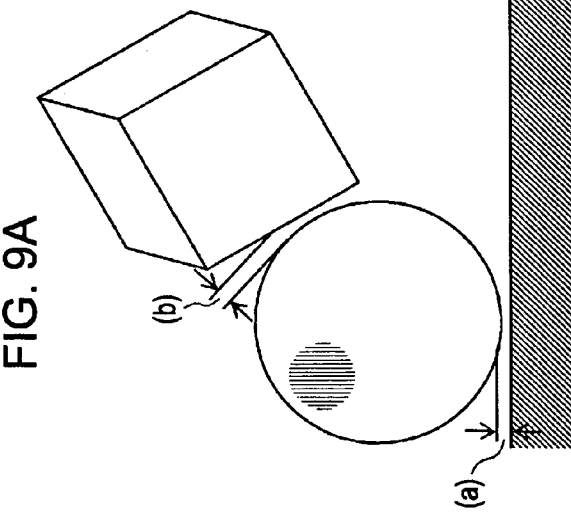

FIGS. 9A-C are diagrams illustrating physical interactions (e.g., collisions and contacts) occurring among objects. In FIG. 9A, collisions between virtual objects are detected at points (a) and (b). The external force can be determined by solving the linear complementarity problem shown by equations (29) to (31) so as to achieve a reaction having a restitution coefficient specified for the objects and an appropriate friction. At that time, an operational space is defined for the points (a) and (b) in directions of a vertical reaction force and a frictional force and, subsequently, the inverse operational space inertia matrix $\Lambda^{-1}$ and the operational-space bias acceleration c are computed at high speed. Thus, this external force can be precisely obtained in a short time. Accordingly, even for a complicated environment, a precise kinetic simulation can be performed in real time.

FIG. 9B illustrates an example in which a haptic device D1 is connected to such a real-time kinetic simulation environment, the position of an object (proxy) P1 in the virtual environment is changed on the basis of the position of the top end of the haptic device D1, and a force acting on the object P1 is fed back to the haptic device D1.

In this case, an operational space (c) relating to the relative position error is defined so that the position of the object P1 is equal to the position instructed by the haptic device D1. Additionally, like the example shown in FIG. 9A, an operational space (d) relating to collision between the object P1 and another object is defined in directions of a vertical reaction force and a frictional force. These constraints are also formulated as the linear complementarity problem represented by equation (29) to (31). According to the present embodiment, the calculation of the inverse operational space inertia matrix $\Lambda^{-1}$ that requires the largest computational amount for this configuration can be performed in real time, and therefore, the sensation of touching the object in the virtual environment can be precisely reproduced in the haptic device D1 in real time.

FIG. 9C illustrates the configuration that can impose constraints (L1 to L4) relating to the position and the orientation on a variety of points of an object (e.g., a human figure) in the virtual environment in addition to the configuration shown in FIG. 9B.

The constraints relating to the position and the orientation can be represented in the form of an equality expression as shown in equation (29). The operational space can be defined by setting three directions parallel to the world coordinate system at a position at which the constraints relating to the position and the orientation are defined. Additionally, by applying the constraints relating to the position and the orientation to a relative position and orientation between an object P2 and another object so as to define the operational space (e) at that position and by feeding back, to a haptic device P2, a force acting on the object P2 when a predetermined position of an object in the virtual environment is pulled or twisted, the sensation of the reaction force to the pull or the twist can be precisely provided.

These problems can also be formulated into the linear complementarity problem indicated by equations (29) to (31) by using the operational space. As in the above-described example, in the configuration shown in FIG. 9C, the calculation of the inverse operational space inertia matrix $\Lambda^{-1}$ requires the largest computational amount. By using the method for computing an inverse operational space inertia matrix according to the present embodiment, the inverse operational space inertia matrix can be computed in real time. Accordingly, for example, a user can control the motion of a human figure and edit the posture of the human figure while receiving the sensation of a force that is the same as that received when the user touches a real object and edits the posture of the human figure. Furthermore, using such force-based posture editing, unstable behavior in the vicinity of a singular point, which often appears in reverse kinematics, can be eliminated.

Functional Structure for Calculating Inverse Operational Space Inertia Matrix

Figure 10:
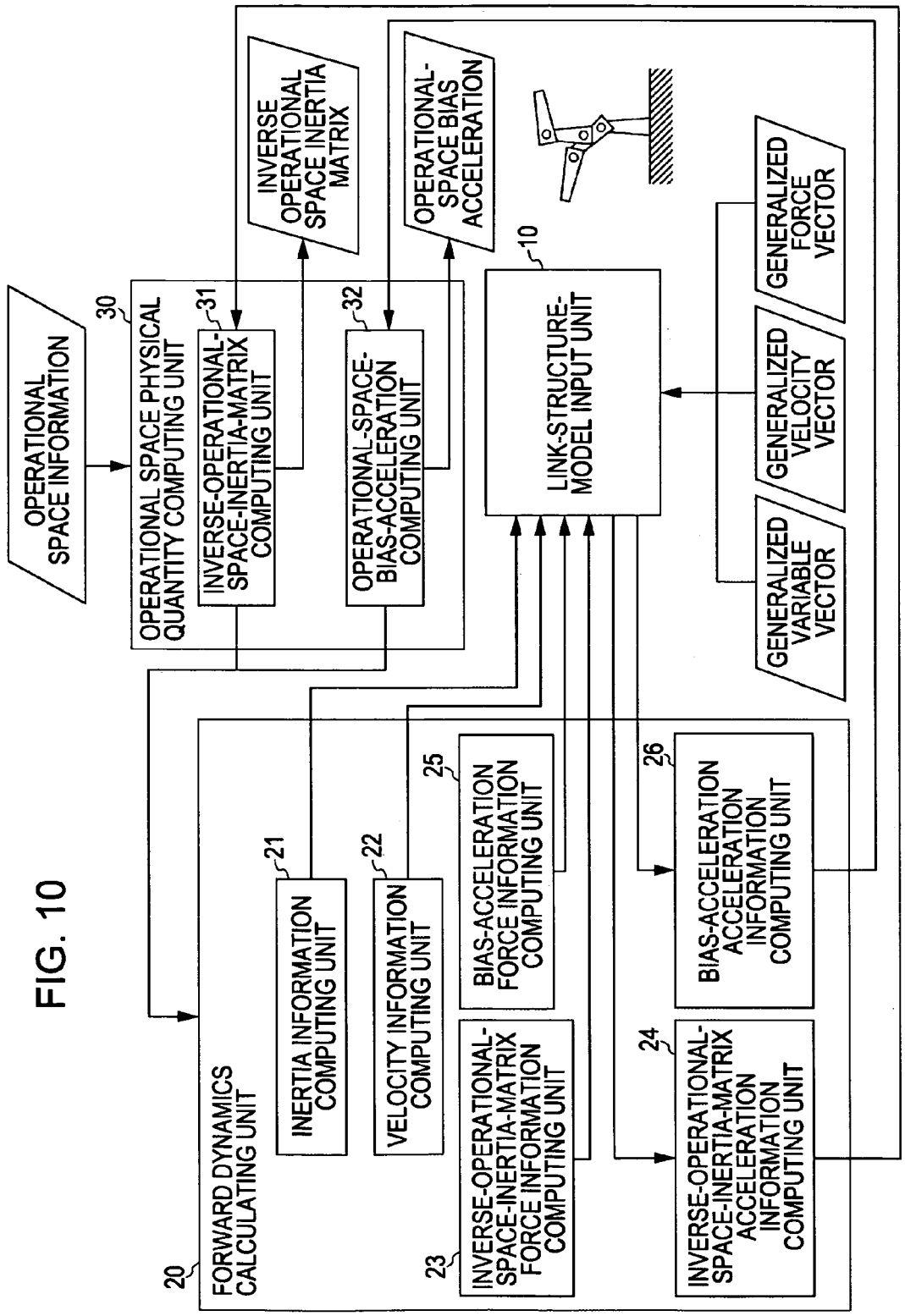
FIG. 10 is a schematic illustration of the functional structure of an apparatus for calculating an inverse operational space inertia matrix on the basis of a method according to an embodiment of the present invention.

FIG. 10 is a schematic illustration of the functional structure of an apparatus for calculating the inverse operational space inertia matrix on the basis of the method according to the present embodiment. As shown in FIG. 10, the apparatus includes a link-structure-model input unit 10, a forward dynamics calculating unit 20, and an operational space physical quantity computing unit 30. This apparatus is realized by running a software program for performing the forward dynamics calculation and the operational space quantity calculation on a widely used computer system (e.g., a personal computer).

The link-structure-model input unit 10 receives and holds the mass, the inertia, the center of gravity, geometric dimensions, and joint attributes (friction and inertia) of each of rigid bodies of a link structure, a method for connecting the rigid bodies, generalized variables (joint values), a generalized velocity (joint velocity), a generalized force (joint force), and variables required for the forward dynamics calculation (e.g., articulated body inertia information, velocity information, force information, and acceleration information). If any one of the generalized variables, the generalized velocity, and the generalized force is changed, the link-structure-model input unit 10 reflects the change to a held link structure model.

The forward dynamics calculating unit 20 includes an inertia information computing unit 21, a velocity information computing unit 22, and an inverse-operational-space-inertia-matrix force information computing unit 23, an inverse-operational-space-inertia-matrix acceleration information computing unit 24, a bias-acceleration force information computing unit 25, and a bias-acceleration acceleration information computing unit 26. The forward dynamics calculating unit 20 provides forward dynamics calculation elements that are necessary for computing the inverse operational space inertia matrix $\Lambda^{-1}$ and the bias acceleration c.

The inertia information computing unit 21 computes inertia information (articulated body inertia) for all of links from the terminal end to the base of the link structure on the basis of equation (12). The computation result is stored in the link-structure-model input unit 10. The computation of the inertia information is carried out only once when the generalized variable is changed.

The velocity information computing unit 22 computes the velocities of all the links from the base to the terminal end of the link structure on the basis of equation (13). The computation result is stored in the link-structure-model input unit 10. The computation of the velocity information is carried out only once when the generalized variable or the generalized velocity is changed.

The inverse-operational-space-inertia-matrix force information computing unit 23 computes force information about rigid bodies on a route between a point of application of an external force and the base on the basis of equation (20). The external force is provided by the operational space physical quantity computing unit 30. On the basis of the external force information, a force information computing route is determined and, subsequently, the force information is computed from the point of application of the external force to the base. The computed force information and the computing route are stored in the link-structure-model input unit 10.

The inverse-operational-space-inertia-matrix acceleration information computing unit 24 computes acceleration information about rigid bodies on a route between the acceleration computing point and the base on the basis of equations (21) and (22) and, subsequently, computes the acceleration at the acceleration computing point using equation (18). It is noted that the acceleration due to gravity is set to zero. The acceleration computing point is provided by the operational space physical quantity computing unit 30. On the basis of the acceleration computing point, the acceleration information computing route is determined and, subsequently, the computation is carried out from the base to the acceleration computing point. The rigid body for which the computation has been carried out is stored in the link-structure-model input unit 10. This stored rigid body serves as a starting point of the calculation of acceleration of the next acceleration computing point. In addition, the computation result of the acceleration information is delivered to the operational space physical quantity computing unit 30.

The bias-acceleration force information computing unit 25 computes equations (14) and (15) under the conditions in which no external forces are applied and, subsequently, computes force information from the terminal end to the base. The computed force information is stored in the link-structure-model input unit 10.

The bias-acceleration acceleration information computing unit 26 computes acceleration information about a rigid body on a route between the acceleration computing point and the base on the basis of equations (16) and (17) and, subsequently, computes the acceleration of the acceleration computing point using equation (18). The acceleration computing point is provided by the operational space physical quantity computing unit 30. On the basis of the acceleration computing point, the acceleration information computing route is determined. Thereafter, the computation is carried out from the base to the acceleration computing point. The rigid body for which the computation has been carried out is stored in the link-structure-model input unit 10. That rigid body serves as a starting point of the calculation of acceleration of the next acceleration computing point. In addition, the computation result of the acceleration information is delivered to the operational space physical quantity computing unit 30.

The operational space physical quantity computing unit 30 includes an inverse-operational-space-inertia-matrix computing unit 31 and an operational-space-bias-acceleration computing unit 32. The operational space physical quantity computing unit 30 computes the inverse operational space inertia matrix and the operational-space bias acceleration by repeatedly using the forward dynamics calculation.

The inverse-operational-space-inertia-matrix computing unit 31 repeatedly computes equation (10) so as to determine each of the columns i of the inverse operational space inertia matrix $\Lambda^{-1}$. To compute equation (10), the inverse-operational-space-inertia-matrix computing unit 31 uses the computation results from the inertia information computing unit 21, the inverse-operational-space-inertia-matrix force information computing unit 23, and the inverse-operational-space-inertia-matrix acceleration information computing unit 24. The inertia information is updated only when the generalized variable is changed. The point of application of the external force and the acceleration measurement point are determined on the basis of the operational space information provided by a user. The accelerations occurring at the acceleration measurement points corresponding to all of the operational spaces are computed (i.e., the inverse-operational-space-inertia-matrix acceleration information is computed) with an external force for one operational space being applied (i.e., after the inverse-operational-space-inertia-matrix force information is computed). Thus, the acceleration occurring in each operational space is computed on the basis of the operational space information. This computation is repeated until the inverse operational space inertia matrix $\Lambda^{-1}$ is achieved.

The operational-space-bias-acceleration computing unit 32 computes equation (11) so as to determine the operational space bias acceleration. To compute equation (11), the operational-space-bias-acceleration computing unit 32 uses the computation results from the inertia information computing unit 21, the velocity information computing unit 22, the inverse-operational-space-inertia-matrix force information computing unit 23, the inverse-operational-space-inertia-matrix acceleration information computing unit 24. The inertia information is updated only when the generalized variable is changed. The acceleration measurement points are determined on the basis of the operational space information provided by a user. The accelerations occurring at the acceleration measurement points corresponding to all of the operational spaces are computed (i.e., the bias-acceleration acceleration information is computed) with the generalized force, the force of gravity, and a velocity product being applied (i.e., after the bias-acceleration force information is computed). Thus, the acceleration occurring in each operational space is computed on the basis of the operational space information so that the operational-space bias acceleration c can be obtained.

Figure 11B:
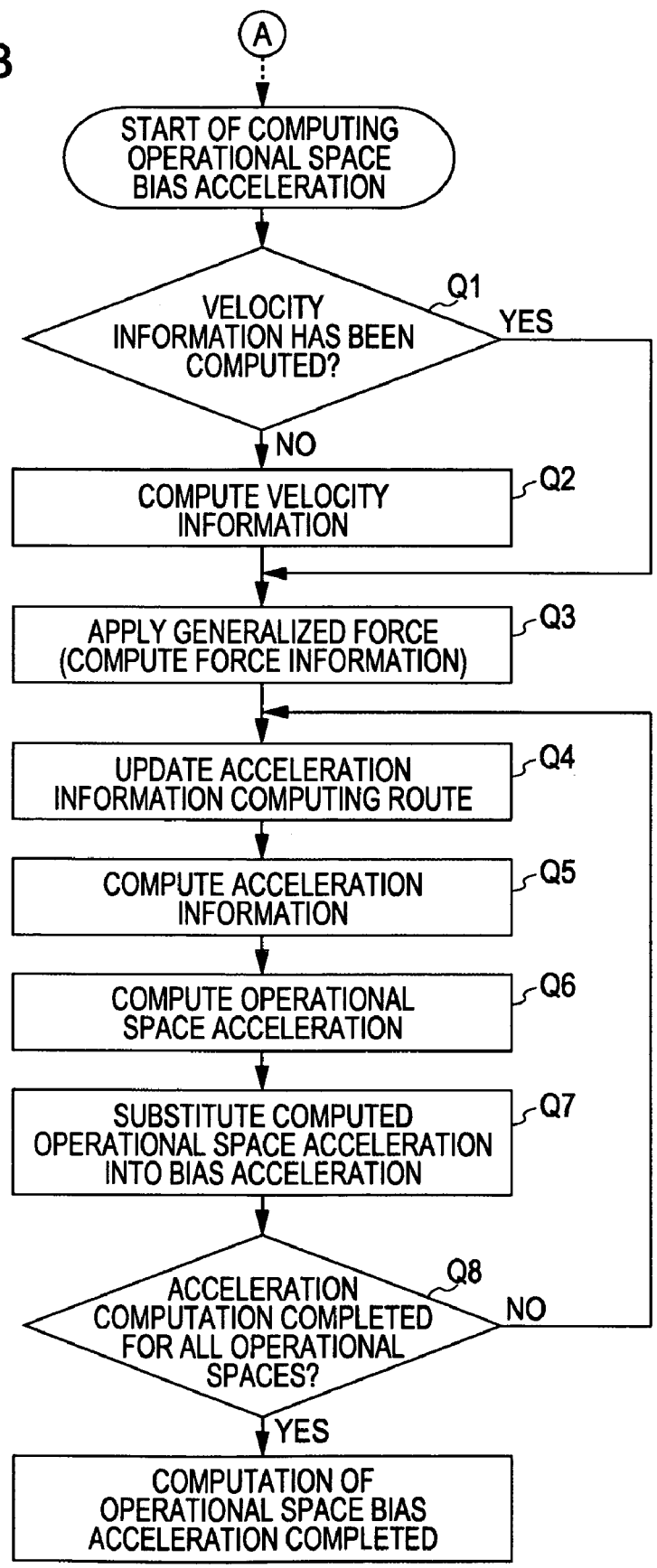
FIG. 11 is a flow chart illustrating the procedure for computing an inverse operational space inertia matrix and an operational-space bias acceleration in the apparatus having the functional structure shown in FIG. 10.

FIG. 11 is a flow chart illustrating the procedure for computing the inverse operational space inertia matrix and the operational-space bias acceleration performed by an apparatus having the functional structure shown in FIG. 10. In FIG. 11, steps P1 through P14 execute the processing for obtaining the inverse operational space inertia matrix whereas steps Q1 through Q8 execute the processing for obtaining the operational-space bias acceleration.

At step P1, the generalized variable, the generalized velocity, and the generalized force are set in the link structure model.

At step P2, information about the operational space to be computed is acquired from the user. A data structure for storing information about each type of operational space (e.g., the direction in which a force is applied to the specific portion of a rigid body, the relative displacement between two rigid bodies, and the barycentric velocity) is defined. The list of the data structures is input.

At step P3, a list of external forces corresponding to the operational spaces is generated from the information about the operational spaces received at step P2. It is noted that a plurality of external forces may correspond to one operational space.

At step P4, as in step P3, a list of acceleration measurement points corresponding to the operational spaces is generated from the information about the operational spaces received at step P2. It is noted that a plurality of acceleration measurement points may correspond to one operational space.

At steps P5 and P6, the articulated body inertia for all of the rigid bodies is computed by the inertia information computing unit 21 using equation (12) unless the articulated body inertia has been updated.

At step P7, a set of the external forces is retrieved from the external force list generated at step P3 one by one so that a force information computing route between the point of application of an external force and the base is generated. The generated route is stored in the link structure model.

At step P8, force information about each of rigid bodies with the external forces extracted at step P7 being applied is computed by the inverse-operational-space-inertia-matrix force information computing unit 23 on the basis of equation (20).

At step P9, a set of the acceleration measurement points is retrieved from the acceleration measurement point list generated at step P4 one by one so that an acceleration information computing route between the acceleration measurement point and the closest rigid body for which the acceleration information has been computed is generated. The generated route is stored in the link structure model.

At step P10, the acceleration at the acceleration measurement point extracted at step P9 is computed by the inverse-operational-space-inertia-matrix acceleration information computing unit 24 on the basis of equations (21) and (22).

At step P11, the operational space acceleration is computed from the acceleration at the acceleration measurement point obtained at step P10. For example, in the case shown in the right section of FIG. 17, the difference in acceleration between the points B and C is computed.

At step P12, the inverse-operational-space-inertia-matrix computing unit 31 substitutes the operational space acceleration computed by the inverse-operational-space-inertia-matrix acceleration information computing unit 24 at step P11 into a predetermined position of the inverse operational space inertia matrix (the position of an ith column and a jth row when i denotes the index of the external force and j denotes the index of the acceleration).

At step P13, it is determined whether the acceleration computation is performed for all the acceleration measurement points generated at step P4. If the acceleration computation has not been completed, the processing returns to step P9, where the acceleration at another acceleration measurement point is computed under the same external force application conditions.

At step P14, it is determined whether all the applications of external force generated at step P3 have been completed. If all the applications of external force have not been completed, the processing returns to step P7, where another external force is applied.

By sequentially performing the above-described processing on all the sets of external forces and all the sets of acceleration measurement points, the inverse operational space inertia matrix can be obtained. It should be noted that, since the inverse operational space inertia matrix is a symmetric matrix, the above-described processing can only be carried out for the entries of indices $i \geq j$ (or $i < j$).

To compute the operational-space bias acceleration, the following processing is performed after the above-described inverse operational space inertia matrix calculation is completed.

At steps Q1 and Q2, the velocity information computing unit 22 computes velocity information about all of the rigid bodies only when the velocity information is not updated.

At step Q3, the bias-acceleration force information computing unit 25 computes equations (14) and (15) under the conditions in which no external forces are applied. Thus, force information about each rigid body with the generalized force, the force of gravity, and the force based on the velocity product being applied is computed.

At step Q4, a set of acceleration measurement points is retrieved from the acceleration measurement point list generated at step P4 one by one so that an acceleration information computing route between the acceleration measurement point and the closest rigid body for which the acceleration information computation has been executed is generated. The generated route is stored in the link structure model.

At step Q5, the bias-acceleration acceleration information computing unit 26 computes the acceleration information about a rigid body on the route between the acceleration measurement point and the base on the basis of equations (16)

and (17). Subsequently, the acceleration at the acceleration measurement point extracted at step Q4 is computed using equation (18).

At step Q6, the operational-space-bias-acceleration computing unit 32 solves equation (11) so as to compute the operational-space bias acceleration from the acceleration at the acceleration measurement point computed at step Q5. For example, in the case shown in the right section of FIG. 17, the difference in acceleration between the points B and C is computed.

At step Q7, the operational space acceleration computed at step Q6 is substituted into a predetermined position of the operational space bias acceleration vector (the position of the jth element of the vector when j denotes the index of the acceleration).

At step Q8, it is determined whether the acceleration computation is performed for all the acceleration measurement points generated at step P4. If the acceleration computation has not been completed, the processing returns to step Q4, where the acceleration at another acceleration measurement point is computed.

By performing the above-described processing on all the sets of acceleration measurement points, the operational-space bias acceleration can be obtained.

Parallelization

The above-described methods for computing the inverse operational space inertia matrix and the operational-space bias acceleration can be further sped up by executing the methods on a parallel computer known as a grid computer or a cluster PC. This is because, although the inverse operational space inertia matrix is an M×M square matrix, each of the elements of the matrix can be independently computed by using different CPUs. In addition, the operational-space bias acceleration is a vector having M elements. Each element of the operational-space bias acceleration vector can also be independently computed by using different CPUs.

Figures 12, 12A:
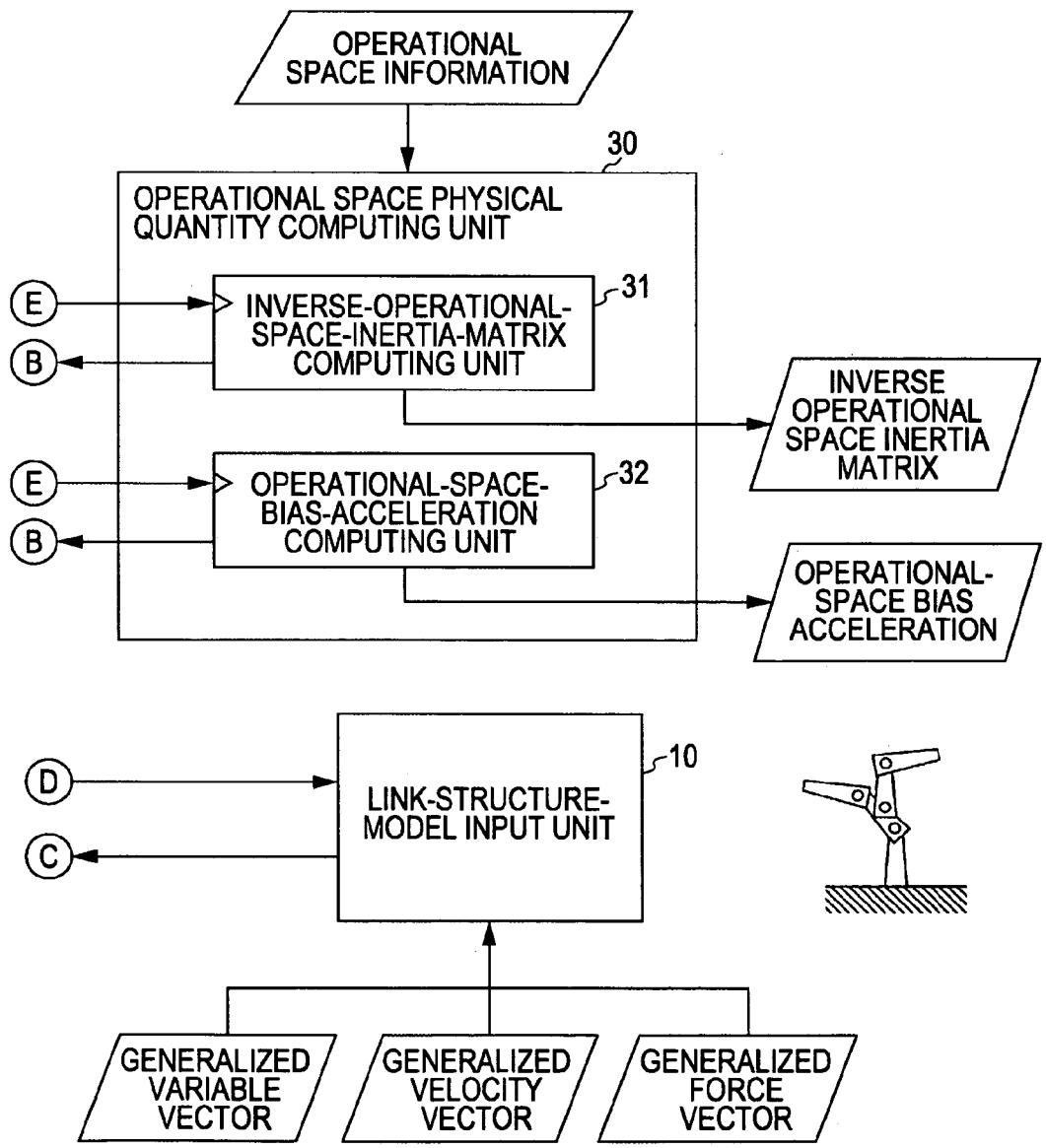
FIG. 12 is a schematic illustration of the functional structure of an apparatus that computes elements of an inverse operational space inertia matrix in parallel.

FIG. 10 illustrates the functional structure of an apparatus for computing the inverse operational space inertia matrix and the operational-space bias acceleration on the basis of the method according to the present embodiment whereas FIG. 12 illustrates the modification of the apparatus that can process the method in parallel. The apparatus shown in FIG. 12 differs from the apparatus shown in FIG. 10 in the following three respects:

(1) The inverse-operational-space-inertia-matrix force information computing unit 23 in the forward dynamics calculating unit 20 is independently provided for each column of the inverse operational space inertia matrix, and therefore, computation for each column can be allocated to a different CPU;

(2) The inverse-operational-space-inertia-matrix acceleration information computing unit 24 is independently provided for each row of the inverse operational space inertia matrix in order to obtain elements in the same column in the row direction using the force information from the inverse-operational-space-inertia-matrix force information computing unit 23 provided for each column, and therefore, computation for each element can be allocated to a different CPU; and (3) The bias-acceleration acceleration information computing unit 26 is provided for each row in order to obtain elements of each row of the bias acceleration vector using the force information from the bias-acceleration force information computing unit 25.

Figure 13B:
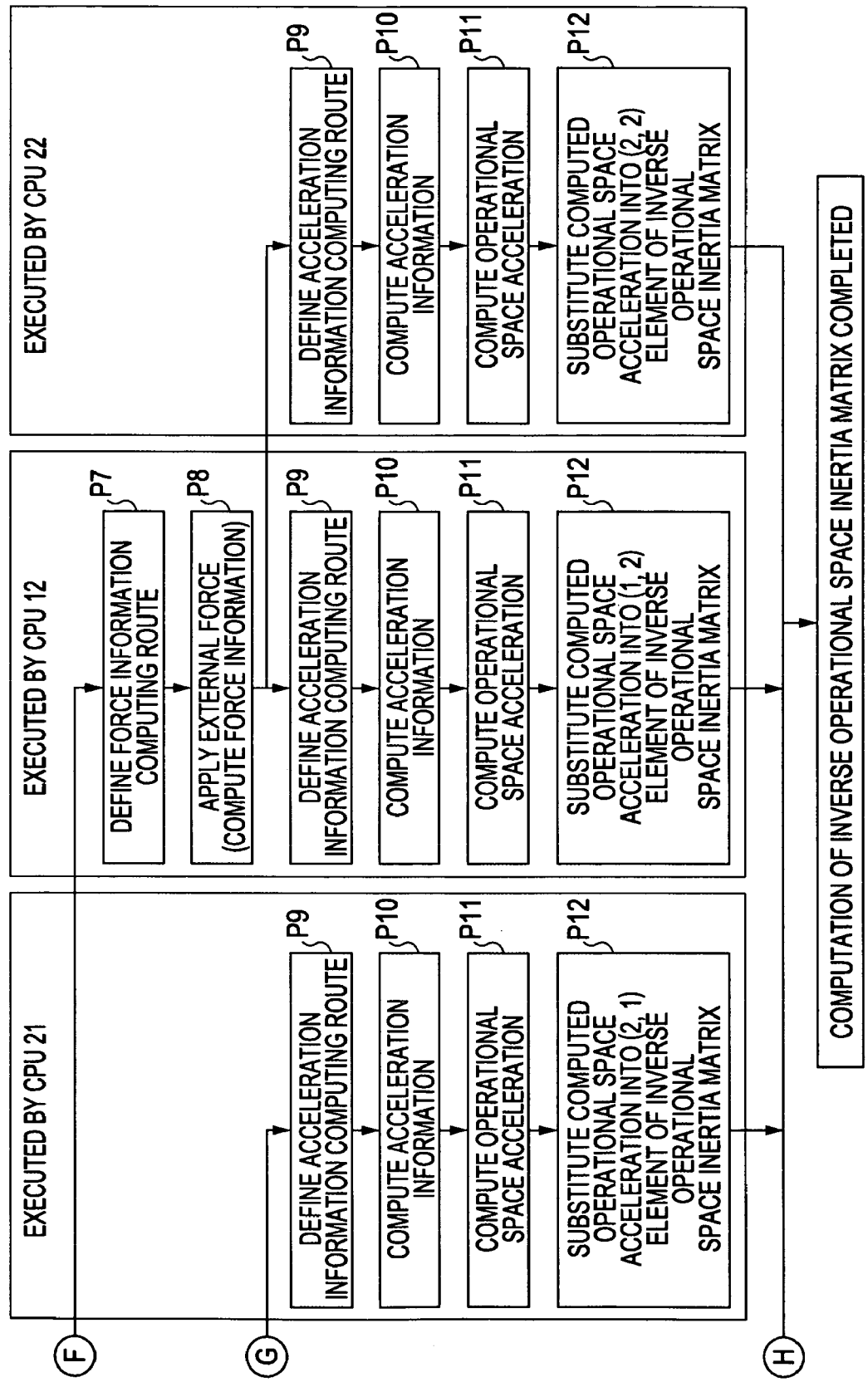
FIG. 13 is a flow chart illustrating the procedure for computing an inverse operational space inertia matrix performed by an apparatus for computing an inverse operational space inertia matrix and a bias acceleration in parallel.

FIG. 13 is a flow chart illustrating the procedure for computing the inverse operational space inertia matrix performed by the apparatus for computing the inverse operational space inertia matrix and the bias acceleration in parallel. In FIG. 13, an example for computing a 2×2 inverse operational space inertia matrix is illustrated.

Even when the processing is parallelized, the same steps up to step P6 are employed.

Different CPUs executing the function of the inverse-operational-space-inertia-matrix force information computing unit 23 in the forward dynamics calculating unit 20 are independently provided for the first and second columns. That is, the computation of the force information at step P7 is executed by different CPUs 11 and 12 for the two columns in parallel.

A CPU for executing the function of the inverse-operational-space-inertia-matrix acceleration information computing unit 24 is provided for each of the first column and the second column so that calculation for individual elements after step P9 can be performed by the different CPUs. That is, for the first column, the computation of the acceleration information using the inverse-operational-space-inertia-matrix force information computed by the CPU 11 is allocated to the independent CPUs 11 and 21. Thus, two elements of the first column in the row direction are computed in parallel. Similarly, for the second column, the computation of the acceleration information using the inverse-operational-space-inertia-matrix force information computed by the CPU 12 is allocated to the independent CPUs 12 and 22. Thus, two elements of the second column in the row direction are computed in parallel.

Figure 14:
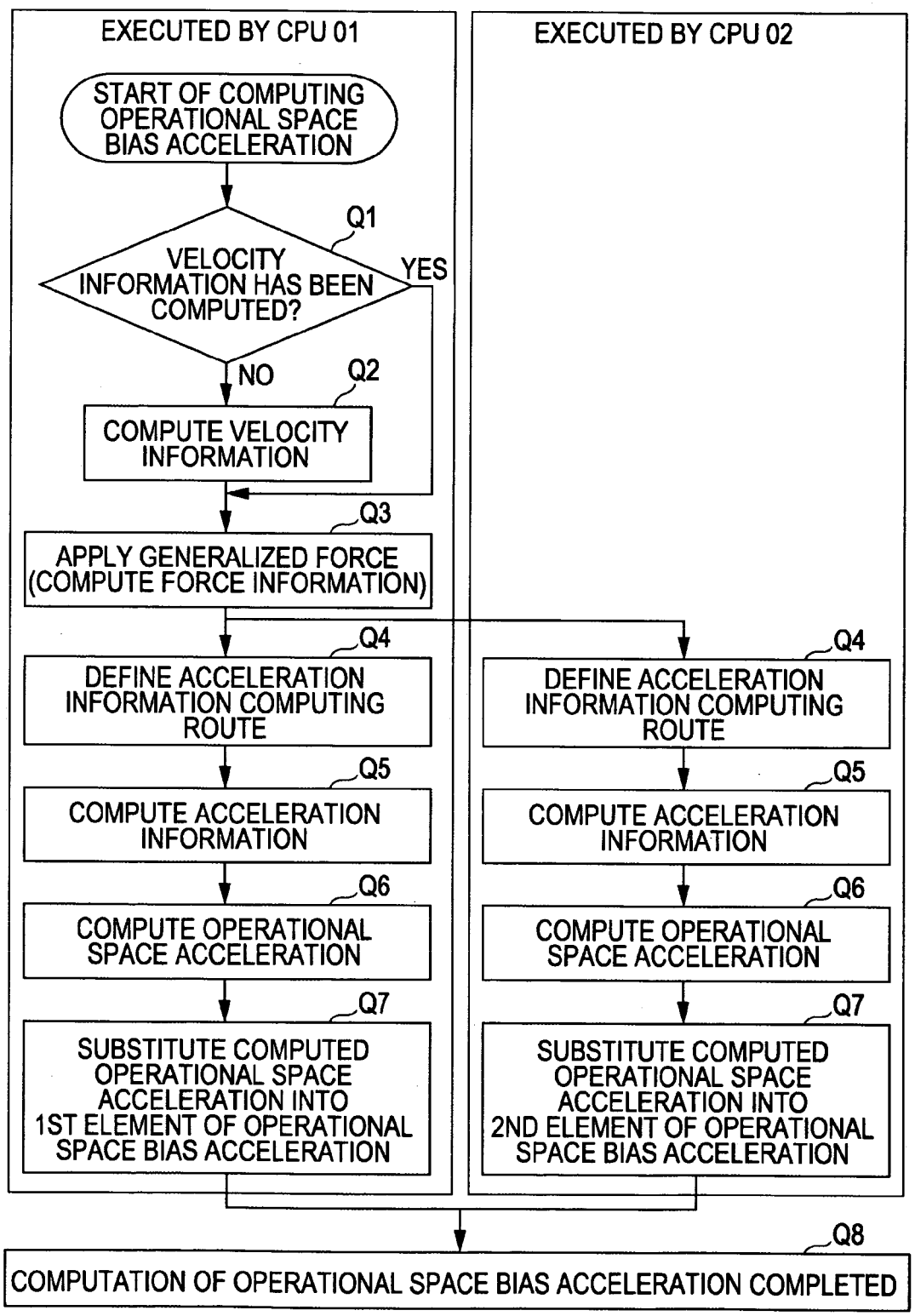
FIG. 14 is a flow chart illustrating the procedure for computing an operational space bias acceleration performed by an apparatus for computing an inverse operational space inertia matrix and a bias acceleration in parallel.

FIG. 14 is a flow chart of illustrating the procedure for computing the operational-space bias acceleration performed by the apparatus for computing the inverse operational space inertia matrix and the bias acceleration in parallel. Like FIG. 13, in FIG. 14, an example for computing a 2×2 inverse operational space inertia matrix is illustrated.

Even when the processing is parallelized, the same steps up to step Q3 as those in FIG. 10 are employed (in step Q3, the generalized force is applied, i.e., the force information is computed). To obtain elements in each row of the bias acceleration vector using the force information from the bias-acceleration force information computing unit 25, a CPU for executing the function of the bias-acceleration acceleration information computing unit 26 is provided for each row. The computation of the acceleration information after step Q4 is performed in parallel by CPUs 01 and 02 that are provided for two rows.

As shown in FIGS. 12 through 14, by configuring the apparatus so as to compute the inverse operational space inertia matrix and the bias acceleration in parallel, the computation is performed for each element of the matrix or vector in parallel. Accordingly, the computation of all the elements can be completed within the computing time required for the computation of one element, and therefore, significant reduction of the total time can be achieved.

While there has been described and illustrated a configuration in which all the elements of the inverse operational space inertia matrix are computed using different CPUs in parallel, it will be apparent to those skilled in the art that a configuration in which only some of the elements are computed in parallel can also achieve the significant reduction of the total time.

Figure 15A:
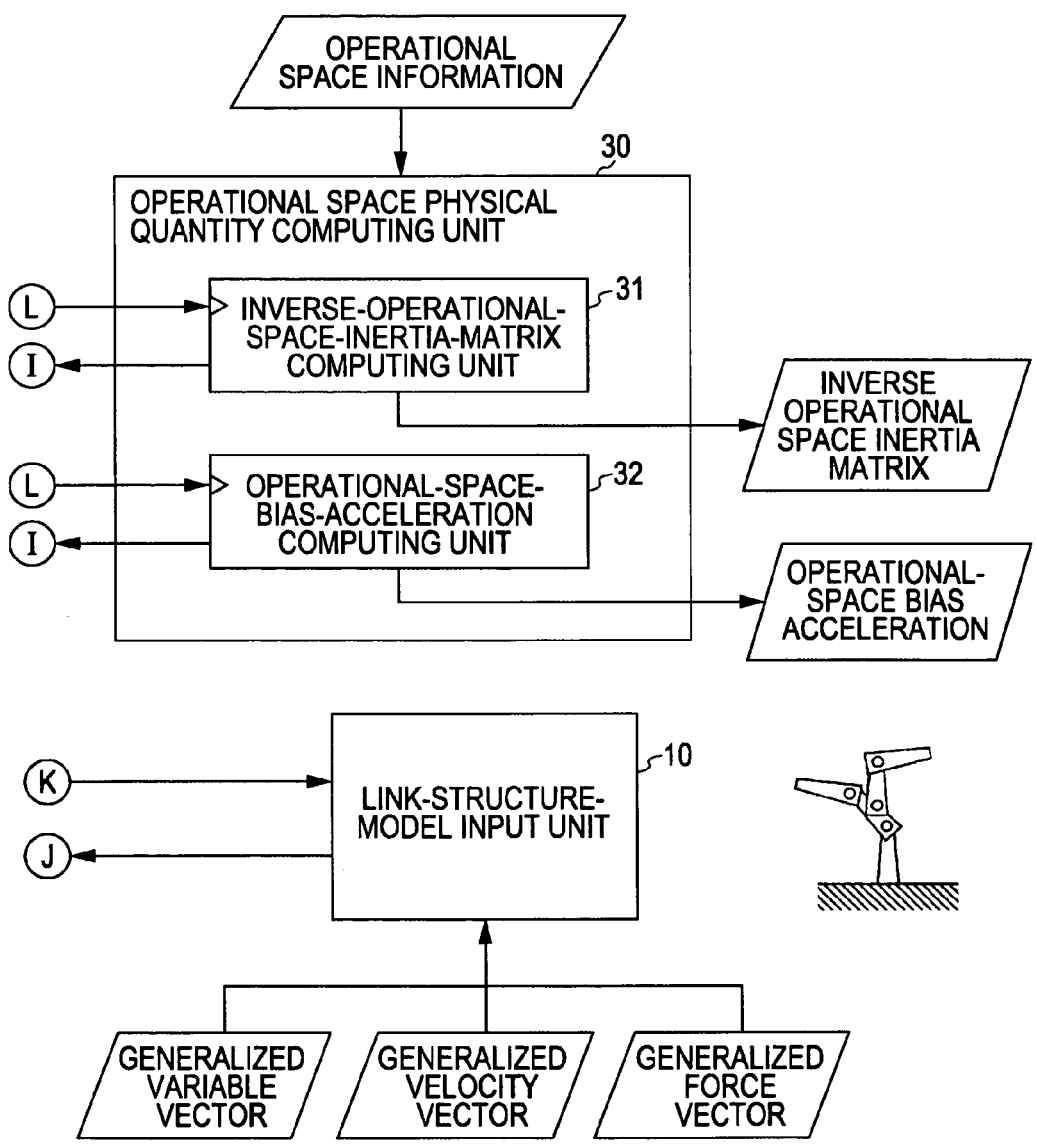
FIG. 15 illustrates a configuration in which the elements in individual columns of the inverse operational space inertia matrix are computed in parallel.
Figure 15B:
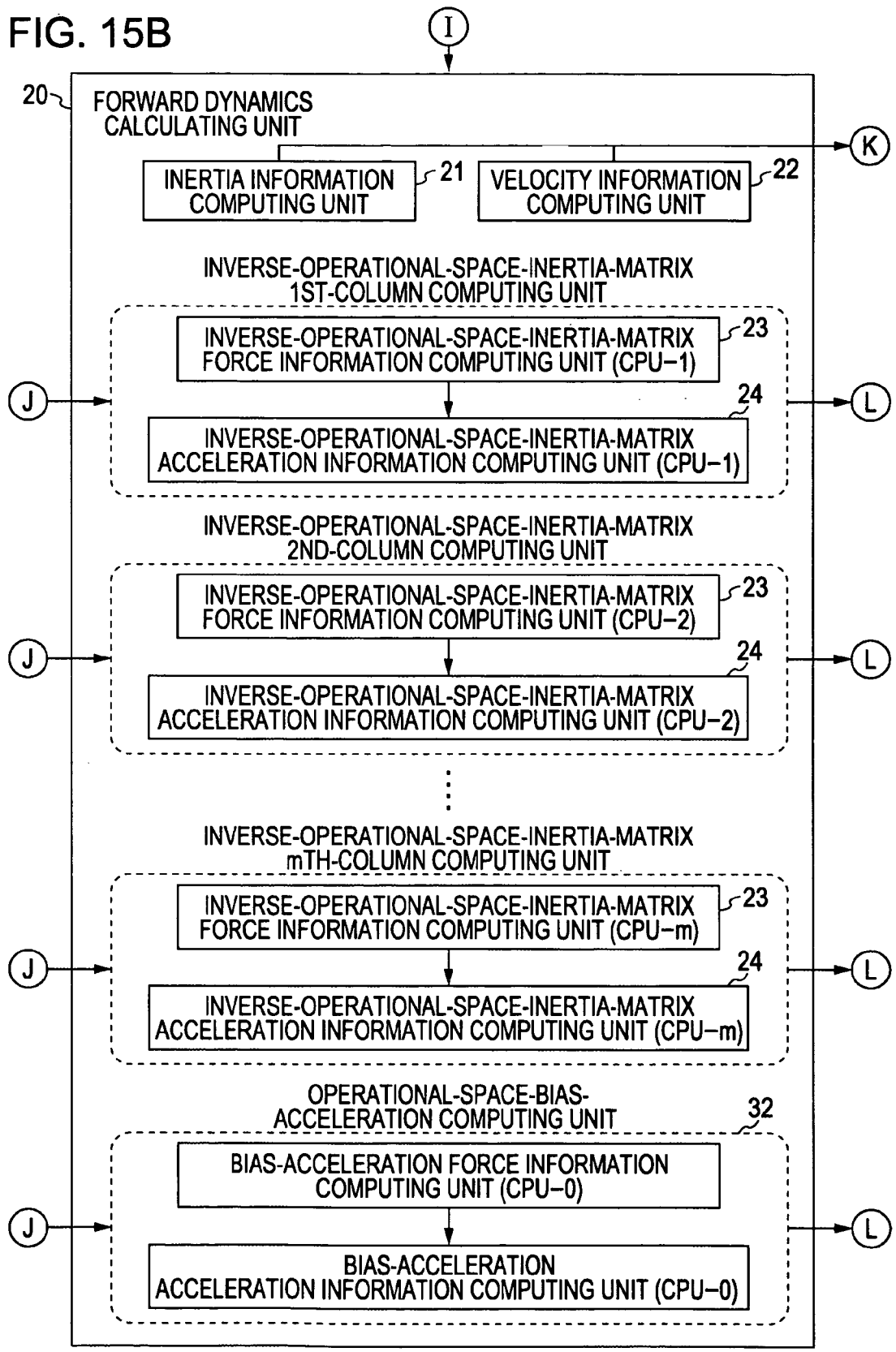

FIG. 15 illustrates a configuration in which the elements in individual columns of the inverse operational space inertia matrix are computed in parallel. The difference between the configuration shown in FIG. 15 and that shown in FIG. 10 are as follows:

(1) The inverse-operational-space-inertia-matrix force information computing unit 23 is independently provided for each column of the inverse operational space inertia matrix so that the computations for individual columns can be allocated to different CPUs; and (2) The inverse-operational-space-inertia-matrix acceleration information computing unit 24 is provided for each column in order to compute the elements in the column in the row direction using the inverse-operational-space-inertia-matrix force information output from the inverse-operational-space-inertia-matrix force information computing unit 23. By repeatedly using the inverse-operational-space-inertia-matrix acceleration information computing unit 24, the acceleration for the column is computed.

Figure 16B:
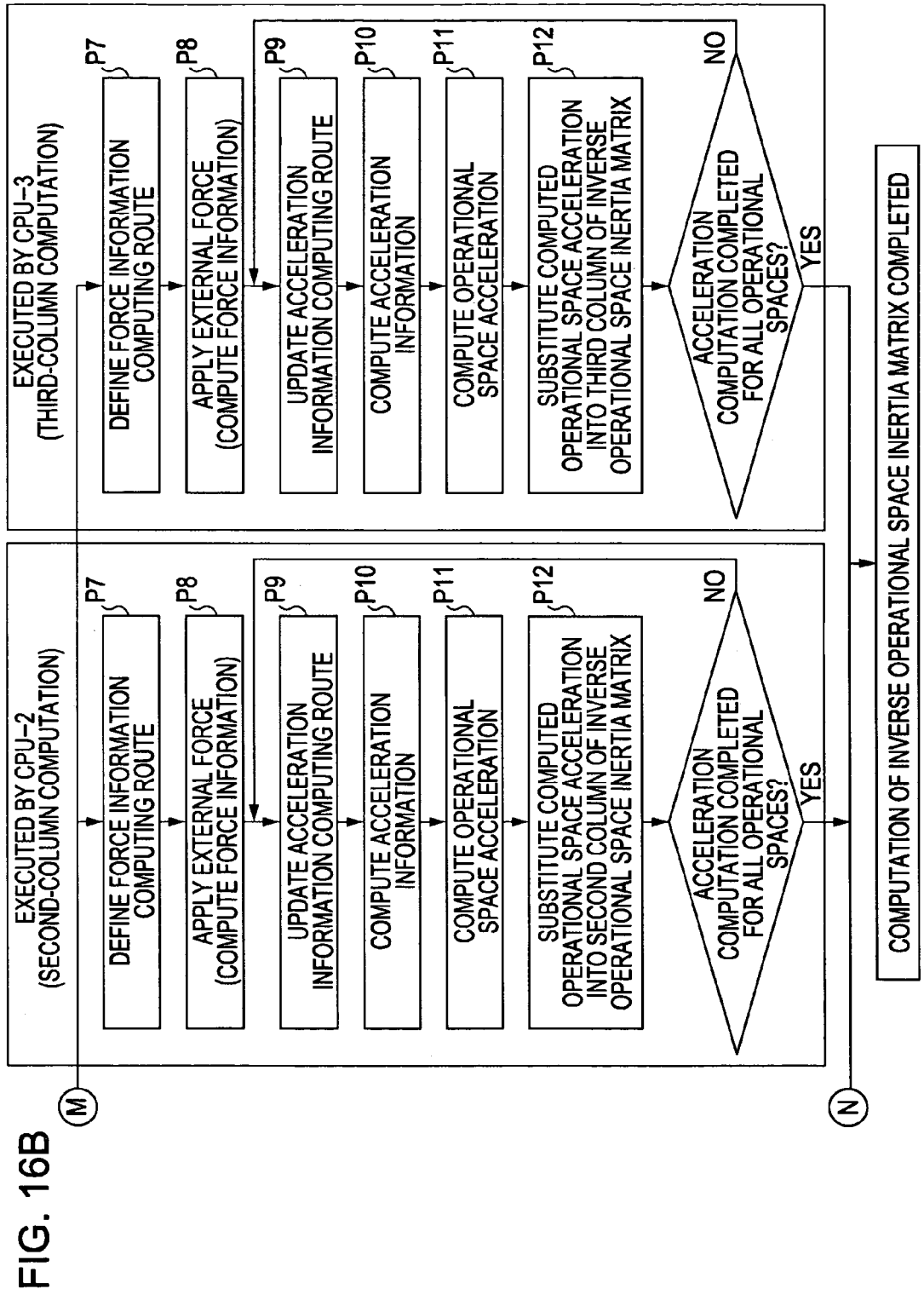
FIG. 16 is a flow chart illustrating the procedure for computing the inverse operational space inertia matrix performed by the configuration of the apparatus shown in FIG. 15.

FIG. 16 is a flow chart illustrating the procedure for computing the inverse operational space inertia matrix performed by the configuration of the apparatus shown in FIG. 15. In FIG. 15, an example for computing a 3×3 inverse operational space inertia matrix is illustrated.

Even when the processing is parallelized, the same steps up to step P6 as those in FIG. 10 are employed (in step P6, the inertia information is computed).

A CPU for executing the function of the inverse-operational-space-inertia-matrix force information computing unit 23 is independently provided for each of a first column to a third column in the forward dynamics calculating unit 20. That is, the calculation of the force information at step P7 is carried out in parallel by using different CPUs 1 to 3 provided for individual columns.

Subsequently, the computation corresponding to the inverse-operational-space-inertia-matrix acceleration information computing unit 24 for the elements in a column in the row direction is repeatedly carried out using the CPUs 1 to 3 provided for individual columns. Each of the CPUs 1 to 3 computes the acceleration information for one column.

As shown in FIGS. 15 and 16, by configuring the apparatus so as to compute the inverse operational space inertia matrix and the bias acceleration in parallel, the computations are performed for individual columns of the matrix in parallel. Accordingly, the computation of all the elements can be completed within the computing time in proportion to the number of the columns of the inverse operational space inertia matrix, and therefore, the speed-up can be effectively achieved.

When a plurality of CPUs are available, the computing speed can be further increased by using the forward dynamics calculation algorithm for parallel processing (refer to, for example, "A Divide-and-Conquer Articulated-Body Algorithm for Parallel O(log(n)) Calculation of Rigid-Body Dynamics," J. Robotics Research, vol. 18, no. 9, pp. 867-875, 1999).

It should be understood by those skilled in the art that various modifications, combinations, sub-combinations and alterations may occur depending on design requirements and other factors insofar as they are within the scope of the appended claims or the equivalents thereof.

What is claimed is:

1. An operational space physical quantity calculation apparatus for computing a physical quantity in an operational space describing a relationship between forces and accelerations acting on a link structure including a plurality of linked rigid bodies, the apparatus comprising:
a forward dynamics calculating unit configured to perform a forward dynamics calculation based on a kinetic model of the link structure, the forward dynamics calculating unit being configured to:
calculate force information for a subset of the linked rigid bodies disposed between a terminal end of the link structure and a base point of the link structure, the force information corresponding to at least one force acting on the link structure;
identify, based on the operational space, a reference point disposed alone the link structure, and
determine an acceleration at the reference point, based on at least the calculated force information; and
an operational space physical quantity computing unit configured to compute an inverse operational space inertia matrix and an operational space bias acceleration.

2. The operational space physical quantity calculation apparatus of claim 1, wherein:
the linked rigid bodies are associated with a joint;
a value of a force occurring at the joint of the link structure is zero;
the velocity of the joint is zero;
the force of gravity is zero; and
a non-zero external force acts on the link structure.

3. The operational space physical quantity calculation apparatus of claim 2, wherein:
a unit external force is applied to an $i^{th}$ operational space; and
the operational space physical quantity computing unit is further configured to compute an $i^{th}$ column of the inverse operational space inertia matrix.

4. The operational space physical quantity calculation apparatus of claim 1, wherein:
the linked rigid bodies are associated with a joint;
an external force acting on the joint is zero;
a force occurring at a joint, the velocity of the joint, and a force of gravity act acting on the joint are non-zero; and
the determined acceleration corresponds to an operational-space-bias acceleration.

5. The operational space physical quantity calculation apparatus of claim 1, wherein the forward dynamics calculating unit is further configured to:
compute inertia information associated with the subset of linked rigid bodies; and
obtain velocity information associated with the subset of the linked rigid bodies.

6. The operational space physical quantity calculation apparatus of claim 5, wherein the forward dynamics calculating unit is further configured to compute the inertia information by solving the following equation in terms of an articulated body inertia $I^A_i$ for the subset of linked rigid bodies:

$$I_i^A = I_i + \Sigma_{j \in C(i)} \{I_j^A - I_j^A S_j (S_j^T I_j^A S_j)^{-1} S_j^T I_j^A\},$$

where represents the inertia of a link i, C(i) represents the set of indices of child links of the link i, and $S_j$ represents a matrix indicating the number of degrees of freedom of motion of a joint of a link j.

7. The operational space physical quantity calculation apparatus of claim 5, wherein the forward dynamics calculating unit is further configured to compute the velocity information for the subset of linked rigid bodies by solving the following equation:

$$v_i = v_p + S_i \dot{q}_i,$$

where $v_i$ represents the velocity of a link i, p represents the index of the parent link of the link i, $S_i$ represents a matrix indicating the number of degrees of freedom of motion of a joint of the link i, and $q_i$ represents the joint value of the link i.

8. The operational space physical quantity calculation apparatus of claim 1, wherein the forward dynamics calculating unit is further configured to calculate the force information for the subset of linked rigid bodies based on a plurality of external forces simultaneously acting on the link structure.

9. The operational space physical quantity calculation apparatus of claim 8, wherein the forward dynamics calculating unit is further configured to compute bias forces $p^A_i$ for the subset of linked rigid bodies by solving the following equations:

$$p_i^A = v_i \times I_i v_i - \Sigma_{k \in F(i)} f_k + \Sigma_{j \in C(i)} \{p_j + I_j^A S_j (S_j^T I_j^A S_j)^{-1} (\tau_j - S_j^T p_j)\}; \text{ and}$$

$$p_i = p_i^A + I_i^A \dot{S}_i \dot{q}_i,$$

where $f_k$ represents the kth external force in a link i, F(i) represents the set of indices of external forces acting on the link i, and $\tau_i$ represents the joint force of the link i.

10. The operational space physical quantity calculation apparatus of claim 5, wherein the forward dynamics calculating unit is further configured to determine accelerations occurring at a plurality of reference points.

11. The operational space physical quantity calculation apparatus of claim 10, wherein:
the forward dynamics calculating unit is further configured to compute acceleration information comprising accelerations $a_i$ of the subset of linked rigid bodies by solving the following equations:

$$\ddot{q}_i = (S_i^T I_i^A S_i)^{-1} \{\tau_i - S_i^T (I_i^A \alpha_p + p_i)\}; \text{ and}$$

$$\alpha_i = \alpha_p + \dot{S}_i \dot{q}_i + S_i \ddot{q}_i; \text{ and}$$

the forward dynamics calculating unit is further configured to compute an acceleration of a physical quantity x occurring in a direction of a unit external force n acting on the linked rigid body i using the following equation:

$$\ddot{x} = n^T (\alpha_i + g),$$

where $a_i$ represents an acceleration of the link i.

12. The operational space physical quantity calculation apparatus of claim 6, wherein the forward dynamics calculating unit is further configured to:
detect a change in joint value q associated with a generalized variable; and
compute the inertia information, in response to the detected change.

13. The operational space physical quantity calculation apparatus of claim 7, wherein the forward dynamics calculating unit is further configured to:
modify the velocity information by establishing $v_i=0$; and
compute the inverse operational space inertia matrix, based on the modified velocity information.

14. The operational space physical quantity calculation apparatus of claim 9, wherein the forward dynamics calculating unit is further configured to calculate the force information by solving the following equation for the subset of the linked rigid bodies:

$$p_i^A = -\Sigma_{k \in F(i)} f_k + \Sigma_{j \in C(i)} \{p_j - I_j^A S_j (S_j^T I_j^A S_j)^{-1} S_j^T p_j^A\}.$$

15. The operational space physical quantity calculation apparatus of claim 14, wherein the forward dynamics calculating unit is further configured to compute bias forces $p^A_i$ for the linked rigid bodies of the subset associated with a route between a point of application of force and the base point.

16. The operational space physical quantity calculation apparatus of claim 11, wherein the forward dynamics calculating unit is further configured to compute the accelerations $a_i$ by solving the following equations:

$$\ddot{q}_i = -(S_i^T I_i^A S_i)^{-1} S_i^T (I_i^A \alpha_p + p_i^A); \text{ and}$$

$$\alpha_i = \alpha_p + S_i \ddot{q}_i.$$

17. The operational space physical quantity calculation apparatus of claim 16, wherein the forward dynamics calculating unit is further configured to update the accelerations along a route represented by a curve beginning from a point closest to the reference point for which the accelerations have been computed to the reference point.

18. The operational space physical quantity calculation apparatus for claim 11, wherein the forward dynamics calculating unit is further configured to compute the accelerations $a_i$ on a route beginning from the base point to the rigid body associated with the reference point for which the acceleration is to be computed.

19. The operational space physical quantity calculation apparatus of claim 5, wherein:
a force corresponding to the operational space acts on two points of the link structure; and
the forward dynamics calculating unit is further configured to:
compute the inertia information for the subset of linked rigid bodies;
compute the force information about links on routes beginning from the two points to the base point in a direction from the terminal end to the base point with a unit force in the direction of the operational space being applied to the two points;
compute first accelerations from the base point to the two points, wherein an acceleration g due to gravity is zero; and
compute a difference between the first accelerations occurring at the two points, wherein the inverse operational space inertia matrix relates to a relative movement between the two points.

20. The operational space physical quantity calculation apparatus of claim 19, wherein the forward dynamics calculating unit is further configured to:
compute velocity information associated with the subset of linked rigid bodies;
compute the force based on an application of a joint force $\tau$ to the subset of linked rigid bodies;
compute second accelerations from the base point to the two points; and
compute a difference between the second accelerations generate an operational space bias acceleration relating to a relative movement between the two points.

21. The operational space physical quantity calculation apparatus of claim 5, wherein the forward dynamics calculating unit is further configured to:
compute the force information based on $m_i/M$ of a unit force in the direction of the operational space being applied to the subset of linked rigid bodies, where M represents a mass of the entire link structure and $m_i$ represents a mass of a rigid body i;
establish a zero value for an acceleration of due to gravity at an initial one of the subset of linked rigid bodies;
compute accelerations occurring at the centers of gravity $x_{gi}$ of the rigid bodies i; and compute an acceleration occurring at the center of gravity of the link structure to generate the inverse operational space inertia matrix for a center-of-gravity operational space of the link structure.

22. The operational space physical quantity calculation apparatus of claim 3, wherein:
the $i^{th}$ operational space comprises an angular moment operational space and
the forward dynamics calculating unit is further configured to apply a unit force to act on the angular momentum operational space by applying a force obtained by multiplying the angular momentum operational space by a cross product $[-m_i(X_{gi}-X_g)\times]$ and a moment obtained by multiplying the angular momentum operational space by $I_i$ to the center of gravity of the rigid bodies, where $m_i$ is the mass of the rigid body i, $X_g$ is the center of gravity of the link structure, and $X_{gi}$ is the center of gravity of the rigid body i.

23. The operational space physical quantity calculation apparatus of claim 22, wherein the forward dynamics calculating unit is further configured to obtain the inverse operational space inertia matrix by computing an acceleration occurring in the angular momentum operational space using the following equation:

$$\dot{L}=\Sigma\{m_i(\dot{x}_g-\dot{x}_{gi})\times\dot{x}_{gi}+m_i(x_g-x_{gi})\times\ddot{x}_{gi}+\dot{x}_{gi}+\omega_i\times I_i\omega_i+I_i\dot{\omega}_i\},$$

where L represents the angular momentum of the entire link structure.

24. The operational space physical quantity calculation apparatus of claim 1, wherein the forward dynamics calculating unit is further configured to compute at least one of the upper triangular matrix or the lower triangular matrix of the inverse operational space inertia matrix.

25. The operational space physical quantity calculation apparatus of claim 1, wherein the forward dynamics calculating unit is further configured to perform a recursive calculation among the rigid bodies.

26. The operational space physical quantity calculation apparatus of claim 25, further comprising:
a computing route determining unit configured to extract a plurality of the rigid bodies to be recursively calculated, wherein the forward dynamics calculating unit is further configured to perform the recursive calculation for the rigid bodies determined by the computing route determining unit.

27. The operational space physical quantity calculation apparatus of claim 1, wherein computations for elements of at least one of the inverse operational space inertia matrix or the operational space bias acceleration are allocated to a plurality of processors and are carried out in parallel.

28. The operational space physical quantity calculation apparatus of claim 27, wherein the forward dynamics calculating unit includes a processor for computing the force information used for the inverse operational space inertia matrix for each of the columns of the inverse operational space inertia matrix and carries out the computation for the columns of the inverse operational space inertia matrix in parallel.

29. The operational space physical quantity calculation apparatus of claim 28, wherein the forward dynamics calculating unit includes a processor for each row of the inverse operational space inertia matrix in order to compute the acceleration information used for the inverse operational space inertia matrix using the force information output from the processor provided for each column and carries out the computations for the elements in the same column in the row direction in parallel.

30. The operational space physical quantity calculation apparatus of claim 28, wherein the forward dynamics calculating unit independently includes a processor for computing the force information used for the operational space bias acceleration for each row of an operational space bias acceleration vector and carries out the computation for each row of the bias-acceleration acceleration-information in parallel.

31. The operational space physical quantity calculation apparatus of claim 28, wherein the forward dynamics calculating unit includes the processor for each column for computing acceleration information used for the inverse operational space inertia matrix using the force information output from the processor provided for each column, and wherein the forward dynamics calculating unit computes the acceleration for one column by repeatedly using the processor provided for the column.

32. The operational space physical quantity calculation apparatus of claim 1, further comprising:
a joint force determining unit configured to control an operation of the link structure under a force control, the joint force determining unit determining a joint force of the link structure using the calculated inverse operational space inertia matrix and the calculated operational space bias acceleration.

33. The operational space physical quantity calculation apparatus of claim 32, wherein the joint force determining unit is further configured to:
compute, by using the inverse operational space inertia matrix and the operational space bias acceleration computed by the operational space physical quantity computing unit, an acceleration and a force that satisfy a linear complementarity problem; and
determine the joint force of the link on the basis of the computed force that satisfies the linear complementarity problem.

34. An operational space physical quantity calculation method for computing a physical quantity in an operational space describing a relationship between forces and accelerations acting on a link structure including a plurality of linked rigid bodies, comprising the steps of:
computing, using a processor, an inverse operational space inertia matrix by performing a forward dynamics calculation of the link structure, based on a kinetic model of the link structure, the performing comprising:
calculating force information for a subset of the linked rigid bodies disposed between a terminal end of the link structure and a base point of the link structure, the force information corresponding to a force acting on the link structure;
identifying, based on the operational space, a reference point disposed along the link structure, and
determining an acceleration at the reference point, based on at least the computed force information; and
computing, using a processor, an operational space bias acceleration based on the forward dynamics calculation.

35. The operational space physical quantity calculation method of claim 34, wherein:
the linked rigid bodies are associated with a joint; and
computing the inverse operational space inertia matrix comprises:
establishing a first set of constraint conditions comprising (i) a force occurring at a joint of the link structure is zero, (ii) the velocity of the joint is zero, (iii) the force of gravity is zero, and (iv) a non-zero external force acts on the link structure.

36. The operational space physical quantity calculation method of claim 35, wherein:
the first set of constraint conditions further comprises that a unit external force is applied to an $i^{th}$ operational space; and
computing the inverse operational space inertia matrix and comprises sequentially computing an $i^{th}$ column of the inverse operational space inertia matrix.

37. The operational space physical quantity calculation method of claim 34, wherein:
the linked rigid bodies are associated with a joint; and
computing the operational space bias acceleration comprises:
establishing a second set of constraint conditions comprising (i) an external force acting on the joint is zero and (ii) a force occurring at a joint, a velocity of the joint, and a force of gravity are non-zero at the joint.

38. The operational space physical quantity calculation method of claim 34, wherein performing the forward dynamics calculation further comprises:
computing inertia information associated with the subset of linked bodies; and
obtaining velocity information associated with the subset of the linked rigid bodies.

39. The operational space physical quantity calculation method of claim 38, wherein:
the force corresponds to the operational space and acts on two points of the link structure
calculating the force information comprises calculating the force information about links on routes beginning from the two points to the base in a direction from the terminal end to the base point with a unit force in the direction of the operational space being applied to the two points;
determining first accelerations from the base point to the two points, wherein an acceleration g due to gravity is zero;
computing a difference between the accelerations occurring at the two points, wherein the inverse operational space inertia matrix relates to a relative movement between the two points.

40. The operational space physical quantity calculation method of claim 39, wherein:
calculating the computes force information comprises calculating the force information for the subset of linked rigid bodies, based on at least a joint force $\tau$ being applied to the linked rigid bodies;
computing second accelerations from the base point to the two points;
computing a difference between the second accelerations to generate an operational space bias acceleration relating to a relative movement between the two points.

41. The operational space physical quantity calculation method of claim 38, wherein performing the forward dynamics calculation further comprises:
calculating the force information based on $m_i/M$ of a unit force in the direction of the operational space being applied to the subset of linked rigid bodies, where M represents a mass of the entire link structure and $m_i$ represents a mass of a rigid body i;
establishing a zero value for an acceleration of due to gravity at an initial one of the subset of linked rigid bodies;
computing acceleration information from the base to the terminal end while assuming the acceleration due to gravity acting at the beginning point to be zero, and
determining accelerations occurring at the centers of gravity $x_{gi}$ of the rigid bodies i; and
determining an acceleration occurring at the center of gravity of the link structure to generate the inverse operational space inertia matrix for a center-of-gravity operational space of the link structure.

42. The operational space physical quantity calculation method of claim 36, wherein:
the $i^{th}$ operational space comprises an angular moment operational space; and
computing the inverse operational space inertia matrix further comprises applying a force obtained by multiplying the angular momentum operational space by a cross product $[-m_i(X_{gi}-X_g) \times]$ and a moment obtained by multiplying the angular momentum operational space by to the center of gravity of the rigid bodies, where $m_i$ is the mass of the rigid body i, $X_g$ is the center of gravity of the entire link structure, and $X_{gi}$ is the center of gravity of the rigid body i.

43. The operational space physical quantity calculation method of claim 34, wherein computing the inverse operational space inertia matrix comprises computing an acceleration occurring in the angular momentum operational space using the following equation:

$$\dot{L} \Sigma \{m(\dot{x}_g-\dot{x}_{gi}) \times \dot{x}_{gi} + m_i(x_g-x_{gi}) \times \ddot{x}_{gi} + \omega_i \times I_i \omega_i + I_i \dot{\omega}_i\},$$

where L represents the angular momentum of the entire link structure.

44. The operational space physical quantity calculation method of claim 34, wherein computing the inverse operational space inertia matrix further comprises computing at least one of the upper triangular matrix or the lower triangular matrix of the inverse operational space inertia matrix.

45. The operational space physical quantity calculation method of claim 34, further comprising the step of:
determining a joint force of the link structure using the computed inverse operational space inertia matrix and the computed operational space bias acceleration, the joint force being used for controlling the operation of the link structure under a force control.

46. The operational space physical quantity calculation method of claim 45, wherein determining the joint force comprises:
computing, using the inverse operational space inertia matrix and the operational space bias acceleration, an acceleration and a force that satisfy a linear complementarity problem, and
determining the joint force of the link on the basis of the computed force that satisfies the linear complementarity problem.

47. A non-transitory computer-readable storage medium encoded with a computer program for causing a computer system to perform a method for computing a physical quantity in an operational space describing a relationship between forces acting on a link structure in which a plurality of rigid bodies are linked and accelerations, the method comprising the steps of:
computing an inverse operational space inertia matrix by performing a forward dynamics calculation of the link structure, based on a kinetic model of the link structure, the performing comprising:
calculating force information for a subset of the linked rigid bodies disposed between a terminal end of the link structure and a base point of the link structure, the force information corresponding to a force acting on the link structure;
identifying, based on the operational space, a reference point disposed along the link structure, and determining an acceleration at the reference point, based on at least the computed force information; and computing an operational space bias acceleration based on the forward dynamics calculation.

48. An operational space physical quantity calculation apparatus for computing a physical quantity in an operational space describing a relationship between forces and accelerations acting on a link structure including a plurality of linked rigid bodies, the apparatus comprising:

a forward dynamics calculating unit configured to perform a forward dynamics calculation based on a kinetic model of the link structure, the forward dynamics calculating unit being configured to:

calculate force information for a subset of the linked rigid bodies disposed between a terminal end of the link structure and a base point of the link structure, the force information corresponding to at least one force acting on a link structure; and identify, based on the operational space, a reference point disposed along the link structure, and determine an acceleration at the reference point, based on at least the computed force information; and an operational space physical quantity computing unit configured to compute an inverse operational space inertia matrix and an operational space bias acceleration.

* * * * *